(12) United States Patent
Nielsen et al.

(10) Patent No.: US 7,644,654 B2
(45) Date of Patent: Jan. 12, 2010

(54) METHOD OF PASTEURIZING, MONITORING PU-UPTAKE, CONTROLLING PU-UP-TAKE AND APPARATUS FOR PASTEURIZING

(75) Inventors: Jørgen Tage Nielsen, Hellebæk (DK); Kim Christian Dalum, Hørsholm (DK)

(73) Assignee: Sander Hansen A/S, Brondby (DK)

( * ) Notice: Subject to any disclaimer, the term of this patent is extended or adjusted under 35 U.S.C. 154(b) by 1158 days.

(21) Appl. No.: 10/770,793

(22) Filed: Feb. 3, 2004

(65) Prior Publication Data

US 2004/0187707 A1 Sep. 30, 2004

Related U.S. Application Data

(63) Continuation of application No. 09/728,499, filed on Nov. 30, 2000, now abandoned, which is a continuation-in-part of application No. PCT/DK99/00290, filed on Jun. 1, 1999.

(30) Foreign Application Priority Data

| Jun. 3, 1998 | (DK) | ............................... | 1998 00746 |
| Dec. 9, 1999 | (DK) | ............................... | 1999 01766 |

(51) Int. Cl.
*A23L 1/00* (2006.01)

(52) U.S. Cl. ............................... 99/453; 99/468; 99/486; 165/206

(58) Field of Classification Search ........... 99/327–333, 99/352–355, 357, 339, 340, 403–418, 467–479, 99/483–489, 452–455; 165/1, 143, 100–108, 165/206

See application file for complete search history.

(56) References Cited

U.S. PATENT DOCUMENTS

| 659,808 | A |   | 10/1900 | Von Bühler |
| 930,910 | A |   | 8/1909 | Willmann |
| 972,608 | A |   | 10/1910 | Feldmeier |
| 1,040,548 | A | * | 10/1912 | Jones ......................... 165/101 |
| 2,052,396 | A |   | 8/1936 | Getchell |
| 2,256,904 | A |   | 9/1941 | Kintner |
| 2,414,623 | A |   | 1/1947 | Wildermuth |

(Continued)

FOREIGN PATENT DOCUMENTS

DK    DE 29710507    8/1997

(Continued)

*Primary Examiner*—Timothy F. Simone
(74) *Attorney, Agent, or Firm*—Klein, O'Neill & Singh, LLP

(57) ABSTRACT

A continuous flow pasteurization apparatus for a liquid product includes a pasteurization area divided into plural pasteurization zones, each with a connection for heating and/or cooling the product, so that if production stops, it is possible to hold the temperature below the pasteurizing temperature. Upon restarting, the product is reheated to a temperature close to the pasteurizing temperature. The apparatus provides for the control and monitoring of pasteurization units (PU's).

2 Claims, 19 Drawing Sheets

U.S. PATENT DOCUMENTS

| | | |
|---|---|---|
| 2,827,381 A | 3/1958 | Boyd |
| 3,477,359 A | 11/1969 | Burnett |
| 4,479,423 A | 10/1984 | Schwitters et al. |
| 4,534,986 A | 8/1985 | Hasting |
| 4,542,034 A | 9/1985 | Aule et al. |
| 4,584,932 A | 4/1986 | Abma |
| 4,591,463 A | 5/1986 | Nahra et al. |
| 4,727,800 A | 3/1988 | Richmond et al. |
| 4,798,731 A | 1/1989 | Ranjith et al. |
| 4,801,466 A | 1/1989 | Clyne et al. |
| 4,849,235 A | 7/1989 | Braymand |
| 4,876,100 A | 10/1989 | Holm et al. |
| 4,997,662 A | 3/1991 | Lidman et al. |
| 5,063,994 A * | 11/1991 | Verkaart .................... 165/154 |
| 5,168,920 A | 12/1992 | Brauer et al. |
| 5,417,274 A * | 5/1995 | Verkaart .................... 165/103 |

FOREIGN PATENT DOCUMENTS

| | | |
|---|---|---|
| EP | 0081256 | 6/1983 |
| EP | 0118134 | 9/1984 |
| EP | 0943243 | 9/1999 |
| FR | 2603777 | 3/1988 |
| WO | WO 8809621 | 12/1988 |
| WO | WO 9003806 | 4/1990 |
| WO | WO 9409652 | 5/1994 |

* cited by examiner

Data for Continuous Production

| Zone | Tout 380 hl/h | | PU out 380 hl/h | PU out 120 hl/h | Treat. Time 380 hl/h | Elements | Position end of zone |
|---|---|---|---|---|---|---|---|
| | °C | 120 hl/h °C | PU | PU | Seconds | N | N acc |
| Input | — | — | 0 | 0 | | | |
| Reg. 1/8 | 31.1 | 32.4 | 0.0 | 0.0 | 13.3 | 239 | 239 |
| Reg. 2/7 | 62.2 | 62.2 | 0.0 | 0.2 | 13.3 | 239 | 478 |
| Past. 3 | 68.2 | 65.6 | 0.9 | 2.1 | 7.0 | 162 | 640 |
| Past. 4 | 69.6 | 65.7 | 3.2 | 4.6 | 7.0 | 162 | 802 |
| Past. 5 | 69.9 | 65.7 | 6.3 | 7.1 | 7.0 | 162 | 964 |
| Past. 6 | 70.0 | 65.7 | 9.4 | 9.5 | 7.0 | 162 | 1126 |
| Past. 7/2 | 38.8 | 36.2 | 10.1 | 10.1 | 13.3 | 239 | 1365 |
| Past. 8/1 | 7.7 | 4.0 | 10.1 | 10.1 | 13.3 | 239 | 1604 |
| Cooling 9 | 1.0 | 1.0 | 10.1 | 10.1 | | | |

FIG. 13

METHOD OF PASTEURIZING, MONITORING PU-UPTAKE, CONTROLLING PU-UP-TAKE AND APPARATUS FOR PASTEURIZING

CROSS-REFERENCE TO RELATED APPLICATION

This application is a continuation of application Ser. No. 09/728,499, filed Nov. 30, 2000, now abandoned, which is a continuation-in-part of International Application No. PCT/DK99/00290, filed Jun. 1, 1999.

FEDERALLY-SPONSORED RESEARCH OR DEVELOPMENT

Not Applicable

BACKGROUND OF THE INVENTION

The present invention relates to a method of pasteurizing a flow of a liquid product consisting of beer, milk, milk products, fruit juice, fruit juice products or similar consumable liquids, the amount of such liquid product to be pasteurized being at least around 1,000 l/hr.

In connection with heat treating such liquid products to eliminate the bacterial content thereof, a measure of the effectiveness of the heat treatment or pasteurization is the uptake of Pasteurizing Units, PU's. The uptake of PU's is a function of the temperature of the liquid product and the time period in which the liquid product is at a temperature at which PU's are taken up.

It is essential for most applications that a minimum number of PU's be taken up, but on the other hand over-pasteurization should not happen as it will be detrimental to the quality of the pasteurized product.

Many pasteurizing methods and apparatus have a heat exchanger for heating the product up to a certain pasteurizing temperature at which the product is maintained for a period of time. Two conventional types of such apparatus are described in the following in connection with FIGS. 1 and 2 in the accompanying drawings. These known pasteurizers, as well as the pasteurizer disclosed in U.S. Pat. No. 4,997,662, have a holding tube in which the liquid product flows at a certain temperature to which it has been heated before entering the holding pipe.

In case of an anomaly in the operation of the pasteurizer such as a stoppage or a sharp decrease in flow rate of the product, the product in the holding pipe is subjected to over-pasteurization or under-pasteurization so that it has to be discarded. A by-pass can be established or water can substitute the product until normal operation is obtained again.

SUMMARY OF THE INVENTION

A main object of the invention is to provide a method wherein the above drawbacks have been eliminated and wherein a more secure pasteurization is achieved where under-pasteurization can be avoided under substantially all conditions, anomalous or not.

According to the invention, this object is achieved by providing one or more heat exchangers for exchanging heat between the flow of liquid product and heating and/or cooling means, respectively, and maintaining the flow of liquid product inside said one or more heat exchangers during a period of time and at temperatures sufficient for the uptake of Pasteurizing Units (PU's) the majority of a desired predetermined amount of PU's being taken up by the flow of liquid product during said period of time.

Hereby, the pasteurizing takes place in a region of the pasteurizer where it is possible to regulate the temperature of the product and thus avoid over and under-pasteurization when operational anomalies such as stoppages occur.

The advantages of the method according to the invention are greater the greater the degree of pasteurization is carried out in said region and therefore the said majority advantageously is at least 51% of said desired amount of PU's, preferably at least 55%, more preferably at least 60%, even more preferably at least 65%, even more preferably at least 70%, even more preferably at least 75%, even more preferably at least 80%, even more preferably at least 85%, even more preferably at least 90% and even more preferably at least 95%.

The invention also relates to a method of pasteurizing a flow of a liquid product consisting of beer, milk, milk products, fruit juice, fruit juice products or similar consumable liquids, the amount of such liquid product to be pasteurized being at least around 1,000 l/hr, the method comprising the steps of:

providing a pasteurizing heat exchanger for exchanging heat between the liquid product and a flow of fluid, preferably water, so as to heat or cool the liquid product during the passage thereof through the pasteurizing heat exchanger, introducing the flow of liquid product at a product inlet temperature into an inlet of the pasteurizing heat exchanger, introducing the flow of fluid at a fluid inlet temperature into the pasteurizing heat exchanger, discharging the flow of liquid product from an outlet of the pasteurizing heat exchanger at a product outlet temperature, and controlling the rate of flow of the flow of liquid product and/or said product inlet temperature and/or the rate of flow of the flow of fluid and/or said fluid inlet temperature and/or said product outlet temperature such that the flow of liquid product takes up the majority of the Pasteurizing Units, PU's, required for obtaining a desired degree of pasteurization during the passage of said flow of liquid product through the pasteurizing heat exchanger.

Advantageously said majority is at least 51% of said desired amount of PU's, preferably at least 55%, more preferably at least 60%, even more preferably at least 65%, even more preferably at least 70%, even more preferably at least 75%, even more preferably at least 80%, even more preferably at least 85%, even more preferably at least 90% and even more preferably at least 95%.

In most cases it is advantageous to provide several pasteurizing heat exchangers so as to be able to regulate the temperature and PU uptake more efficiently and quickly, and therefore the method according to the invention preferably further comprises the steps of:

providing one or more additional pasteurizing heat exchangers all the pasteurizing heat exchangers being arranged in series such that the flow of liquid product is conducted from the outlet of one pasteurizing heat exchanger to the inlet of the succeeding pasteurizing heat exchanger, and controlling the rate of flow of the flow of liquid product through the series of pasteurizing heat exchangers and/or said product inlet temperature of at least the first of the heat exchangers in said series and/or the rate of flow of the flow of fluid through at least one and preferably all the heat exchangers in said series and/or said fluid inlet temperature of the flow of fluid introduced into at least one and preferably all the heat exchangers in said series and/or said product outlet temperature of at least the last of the heat exchangers in said series such that the entire flow of liquid product takes up a majority of the Pasteurizing Units, PU's, required for obtaining a desired degree of pasteurization during the passage of said liquid product through said series of pasteurizing heat exchangers.

Hereby, it is achieved that the PU's taken up by the product in the pasteurizing heat exchangers may be regulated more accurately and rapidly.

Advantageously, said majority is at least 51% of said desired amount of PU's, preferably at least 55%, more preferably at least 60%, even more preferably at least 65%, even more preferably at least 70%, even more preferably at least 75%, even more preferably at least 80%, even more preferably at least 85%, even more preferably at least 90% and even more preferably at least 95%.

So as to maximize the volume of product being heat treated in a region where the temperature can be regulated, preferably the length of the path of the flow of liquid product from the outlet of one of the pasteurizing heat exchangers in said series to the inlet of the succeeding pasteurizing heat exchanger in said series is substantially as short as possible so as to minimize the volume of liquid product that is not in heat exchange relationship with a flow of fluid.

In most cases it is advantageous to provide a heat recuperating section to recuperate heat from the hot pasteurized product and therefore the method preferably further comprises the steps of:

providing one or more heat recuperating or regenerative heat exchangers for exchanging heat between the unpasteurized liquid product flowing into the one or more pasteurizing heat exchangers and the pasteurized liquid product flowing from the one or more pasteurizing heat exchangers so as to cool the pasteurized liquid product, pre-heat the unpasteurized liquid product to product inlet temperature and recuperate heat energy from the pasteurized liquid product, and determining the number of PU's taken up by the liquid product when flowing through the one or more regenerative heat exchangers in both directions and when flowing along paths of flow leading to and from the one or more pasteurizing heat exchangers from and to, respectively, the one or more regenerative heat exchangers such that the amount of additional PU's to be taken up by the liquid product in the one or more pasteurizing heat exchangers can be determined.

Hereby, the influence of the regenerative heat exchangers may be taken into account in the regulation of the temperature in the pasteurizing heat exchangers in a manner not subject to inaccuracies because of the effect of said regenerative heat exchangers.

So as to reduce the volume of liquid product in a region without temperature regulation possibility, the method preferably comprises the further step of:

providing one or more heat recuperating or regenerative heat exchangers for exchanging heat between the unpasteurized liquid product flowing into the one or more pasteurizing heat exchangers and the pasteurized liquid product flowing from the one or more pasteurizing heat exchangers so as to cool the pasteurized liquid product, pre-heat the unpasteurized liquid product to said first temperature and recuperate the heat energy from the pasteurized liquid product, wherein the length of said paths of flow to and from the one or more pasteurizing heat exchangers from and to, respectively, the one or more regenerative heat exchangers are substantially as short as possible so as to minimize the volume of liquid product that is not in heat exchange relationship with a flow of said fluid.

In a further aspect the invention relates to a method of monitoring the uptake of Pasteurizing Units, PU's, of a flow of liquid product consisting of beer, milk, milk products, fruit juice, fruit juice products or similar consumable liquids, the amount of such liquid product to be pasteurized being at least around 1,000 l/hr, in a pasteurizing apparatus comprising means for exchanging heat between one or more flows of a fluid, preferably water, and the flow of liquid product.

In the known methods of pasteurization the monitoring of the PU uptake is very coarse and inaccurate, and therefore the security against deficient pasteurization is relatively low.

An object of the invention is to provide a method of monitoring the PU uptake that is much more secure and accurate so as to be able to provide a pasteurized product with a consistently high quality.

This object is achieved according to the invention by the method comprising the steps of:

measuring consecutive values of the temperature and of the rate of flow of the fluid and the liquid product at first points along the paths of flow thereof through the apparatus, establishing a mathematical model of the apparatus and, based on said measured consecutive values and the parameters for the heat transfer between the flows of fluid and the flow of liquid product at a number of second points along said paths of flow, calculating the number of PU's taken up by a portion of liquid at any or all of said second points.

Hereby, the PU uptake may be monitored in an accurate and rapid manner, the accuracy depending on the number of second points in the model and therefore preferably the number of second points is sufficiently large for obtaining a desired accuracy of the monitoring of said uptake of PU's, the number of second points advantageously being at least 5, preferably at least 25, more preferably at least 50, even more preferably at least 100, even more preferably at least 150, even more preferably at least 200, even more preferably at least 300, even more preferably at least 400, even more preferably at least 500, even more preferably at least 600, even more preferably at least 700, even more preferably at least 800, even more preferably at least 900, even more preferably at least 1,000, the maximum number of said second points being determined by the calculating capacity of a computing means utilized for calculating said number of PU's.

The number of second points chosen will be a trade off between the desired accuracy of the monitoring and the cost of the calculating capacity.

A further aspect of the invention is to provide a method of controlling the uptake of Pasteurizing Units, PU's, of a flow of liquid product consisting of beer, milk, milk products, fruit juice, fruit juice products or similar consumable liquids, the amount of such liquid product to be pasteurized being at least around 1,000 l/hr, in a pasteurizing apparatus comprising means for exchanging heat between one or more flows of a fluid, preferably water, and the flow of liquid product.

In the known methods of pasteurizing such liquid products, the method of controlling the uptake of PU's by the product is very simple and coarse and therefore the security against under and over-pasteurization is relatively low, particularly in connection with operational anomalies such as stoppages and re-starts.

An object of the invention is therefore to provide a method of controlling said PU uptake that is accurate, rapid and allows fine-tuning of the pasteurizing process.

According to the invention this object is achieved by the method comprising the steps of:

measuring consecutive values of the temperature and of the rate of flow of the fluid and the liquid product at first points along the paths of flow thereof throughout the apparatus, establishing a mathematical model of the apparatus and, based on said measured consecutive values and the parameters for the heat transfer between the flows of fluid and the flow of liquid product at a number of second points along said paths of flow, calculating the number of PU's taken up by a portion of liquid at any of said second points, and altering the temperature and/or rate of flow of one or more of the flows of fluid and/or the rate of flow of the flow of the liquid product such that any unacceptable difference between the calculated uptake of PU's and a desired uptake of PU's for one or more portions of liquid product at corresponding one or more second points is eliminated before said one or more portions exit the apparatus.

The invention further relates to a method of monitoring the operation of a pasteurizing apparatus for pasteurizing a flow of liquid product consisting of beer, milk, milk products, fruit juice, fruit juice products or similar consumable liquids, the amount of such liquid product to be pasteurized being at least around 1,000 l/hr, said apparatus comprising the following elements:

one or more heat exchangers for heating and/or cooling the flow of liquid product, sources of flows of heating and/or cooling fluid for heating and/or cooling the flow of liquid product by means of heat exchange between the flows of fluid and the flow of liquid product, a source of the flow of liquid product to be pasteurized, receiving means for receiving the pasteurized flow of liquid product, the apparatus further comprising:

conduits for flow communication between said elements of the apparatus, temperature sensing means for sensing the temperature of the liquid product and of said fluid at first points along the flow paths of the liquid product and the fluid, respectively, flow rate sensing means for sensing the flow rate of the flows of fluid and of the flow of liquid product, computing means connected to said temperature sensing means and said flow rate sensing means for receiving measured values of temperatures and flow rates, respectively, the method comprising the steps of:

measuring consecutive values of the temperature and of the rate of flow of the fluid and the liquid product at said first points, establishing a mathematical model of the apparatus, and, based on said measured consecutive values and the parameters for the heat transfer between the flows of fluid and the flow of liquid product at a number of second points along said paths of flow, calculating the number of PU's taken up by a portion of liquid at any or all of said second points, the number of second points preferably being sufficiently large for obtaining a desired accuracy of the monitoring of said up-take of PU's.

Advantageously, the number of second points is at least 5, preferably at least 25, more preferably at least 50, even more preferably at least 100, even more preferably at least 150, even more preferably at least 200, even more preferably at least 300, even more preferably at least 400, even more preferably at least 500, even more preferably at least 600, even more preferably at least 700, even more preferably at least 800, even more preferably at least 900, even more preferably at least 1,000, the maximum number of said second points being determined by the calculating capacity of a computing means utilized for calculating said number of PU's.

In a currently preferred embodiment of the method according to the invention, said second points consist of sections, cells or finite elements into which at least part and preferably substantially the entire lengths of the paths of flow of the flows of fluid and the flow of liquid product have been subdivided, each such finite element comprising a certain volume of fluid and/or liquid product and being allocated certain parameters for the heat transfer to and from the liquid product and/or to and from the fluid in said each finite element.

Hereby a particularly accurate and rapid method is obtained.

The invention further relates to a method of controlling the operation of a pasteurizing apparatus for pasteurizing a flow of liquid product consisting of beer, milk, milk products, fruit juice, fruit juice products or similar consumable liquids, the amount of such liquid product to be pasteurized being at least around 1,000 l/hr, said apparatus comprising the following elements:

one or more heat exchangers for heating and/or cooling the flow of liquid product, sources of flows of heating and/or cooling fluid for heating and/or cooling the flow of liquid product by means of heat exchange between the flows of fluid and the flow of liquid product, a source of the flow of liquid product to be pasteurized, receiving means for receiving the pasteurized flow of liquid product, the apparatus further comprising:

conduits for flow communication between said elements of the apparatus, temperature sensing means for sensing the temperature of the liquid product and of said fluid at first points along the flow paths of the liquid product and the fluid, respectively, temperature control means for controlling the temperature of the flows of fluid, flow rate sensing means for sensing the flow rate of the flows of fluid and of the flow of liquid product, flow rate control means for controlling the flow rate of the flows of fluid and of the flow of liquid product, computing means connected to said temperature sensing means and said flow rate sensing means for receiving measured values of temperatures and flow rates, respectively, to said flow control means for sending signals thereto for controlling said rates of flow and to said temperature control means for sending signals thereto for controlling said temperature of the flows of fluid, the method comprising the steps of:

measuring consecutive values of the temperature and of the rate of flow of the fluid and the liquid product at said first points, establishing a mathematical model of the apparatus, based on said measured consecutive values and the parameters for the heat transfer between the flows of fluid and the flow of liquid product at a number of second points along said paths of flow, calculating the number of PU's taken up by a portion of liquid at any or all of said second points, and by means of said signals sent by the computing means regulating the temperature and/or the rate of flow of one or more of the flows of fluid and/or the rate of flow of the flow of the liquid product such that any unacceptable difference between the calculated uptake of PU's and a desired uptake of PU's for one or more portions of liquid product at corresponding one or more second points is eliminated before said one or more portions exit the apparatus.

Hereby a particularly accurate method is obtained for ensuring that no portion of the liquid product is under-pasteurized while at the same time limiting the extent of the corresponding over-pasteurization. In conventional methods the product is often severely over-pasteurized as a general operational principle so as to avoid under-pasteurization.

Advantageously, the number of second points is sufficiently large for obtaining a desired accuracy of the controlling of said uptake of PU's, and the number of second points is at least 5, preferably at least 25, more preferably at least 50, even more preferably at least 100, even more preferably at least 150, even more preferably at least 200, even more preferably at least 300, even more preferably at least 400, even more preferably at least 500, even more preferably at least 600, even more preferably at least 700, even more preferably at least 800, even more preferably at least 900, even more preferably at least 1,000, the maximum number of said second points being determined by the calculating capacity of a computing means utilized for calculating said number of PU's.

In a currently preferred embodiment of the method according to the invention, said second points consist of sections, cells or finite elements into which at least part and preferably substantially the entire lengths of the paths of flow of the flows of fluid and the flow of liquid product have been subdivided, each such finite element comprising a certain volume of fluid and/or liquid product and being allocated certain parameters for the heat transfer to and from the liquid product and/or to and from the fluid in said each finite element.

The invention further relates to a method of controlling the uptake of Pasteurizing Units, PU's, of a flow of liquid product consisting of beer, milk, milk products, fruit juice, fruit juice products or similar consumable liquids, the amount of such liquid product to be pasteurized being at least around 1,000 l/hr, in a pasteurizing apparatus comprising means for exchanging heat between one or more flows of a fluid, preferably water, and the flow of liquid product, said method comprising the steps of:

measuring consecutive values of the temperature and of the rate of flow of the fluid and the liquid product at first points along the paths of flow thereof throughout the apparatus, establishing a mathematical model of the apparatus, based on said measured consecutive values and the parameters for the heat transfer between the flows of fluid and the flow of liquid product at a number of second points along said paths of flow, calculating the number of PU's taken up by a portion of liquid product at any of said second points, establishing an ideal PU-uptake value for each of said second points for the uptake of PU's by the liquid product along the path of flow thereof through the apparatus for a given rate of flow of the flow of liquid product, for given rates of flow of the flows of fluid and for given temperatures of the flows of fluid, and altering the temperature and/or rate of flow of one or more of the flows of fluid and/or the rate of flow of the flow of the liquid product such that all portions of liquid product at the corresponding one or more second points have a PU-uptake at least equal to said ideal PU-uptake value at the corresponding second point.

Hereby a method is achieved for ensuring that no portion of the product is under-pasteurized.

The invention also relates to a method of controlling the uptake of Pasteurizing Units, PU's, of a flow of liquid product consisting of beer, milk, milk products, fruit juice, fruit juice products or similar consumable liquids, the amount of such liquid product to be pasteurized being at least around 1,000 l/hr, in a pasteurizing apparatus comprising the following elements:

one or more heat exchangers for heating and/or cooling the flow of liquid product, sources of flows of heating and/or cooling fluid for heating and/or cooling the flow of liquid product by means of heat exchange between the flows of fluid and the flow of liquid product, a source of the flow of liquid product to be pasteurized, receiving means for receiving the pasteurized flow of liquid product, the apparatus further comprising:

conduits for flow communication between said elements of the apparatus, temperature sensing means for sensing the temperature of the liquid product and of said fluid at first points along the flow paths of the liquid product and the fluid, respectively, temperature control means for controlling the temperature of the flows of fluid, flow rate sensing means for sensing the flow rate of the flows of fluid and of the flow of liquid product, flow rate control means for controlling the flow rate of the flows of fluid and of the flow of liquid product, computing means connected to said temperature sensing means and said flow rate sensing means for receiving measured values of temperatures and flow rates, respectively, to said flow control means for sending signals thereto for controlling said rates of flow and to said temperature control means for sending signals thereto for controlling said temperature of the flows of fluid, the method comprising the steps of measuring consecutive values of the temperature and of the rate of flow of the fluid and the liquid product at said first points, establishing a mathematical model of the apparatus, based on said measured consecutive values and the parameters for the heat transfer between the flows of fluid and the flow of liquid product at a number of second points along said paths of flow, calculating the number of PU's taken up by a portion of liquid at any or all of said second points, establishing an ideal PU-uptake value for each of said second points for the uptake of PU's by the liquid product along the path of flow thereof through the apparatus for a given rate of flow of the flow of liquid product, for given rates of flow of the flows of fluid and for given temperatures of the flows of fluid, and by means of said signals sent by the computing means regulating the temperature and/or the rate of flow of one or more of the flows of fluid and/or the rate of flow of the flow of the liquid product such that all portions of liquid product at the corresponding one or more second points have a PU-uptake at least equal to said ideal PU-uptake value at the corresponding second point.

Advantageously, the number of second points is sufficiently large for obtaining a desired accuracy of the controlling of said uptake of PU's, and the number of second points is at least 5, preferably at least 25, more preferably at least 50, even more preferably at least 100, even more preferably at least 150, even more preferably at least 200, even more preferably at least 300, even more preferably at least 400, even more preferably at least 500, even more preferably at least 600, even more preferably at least 700, even more preferably at least 800, even more preferably at least 900, even more preferably at least 1,000, the maximum number of said second points being determined by the calculating capacity of a computing means utilized for calculating said number of PU's.

In a currently preferred embodiment of the method according to the invention, said second points consist of sections, cells or finite elements into which at least part and preferably substantially the entire lengths of the paths of flow of the flows of fluid and the flow of liquid product have been subdivided, each such finite element comprising a certain volume of fluid and/or liquid product and being allocated certain parameters for the heat transfer to and from the liquid product and/or to and from the fluid in said each finite element.

In a further aspect the invention relates to an apparatus for pasteurizing a flow of a liquid product consisting of beer, milk, milk products, fruit juice, fruit juice products or similar consumable liquids, the amount of such liquid product to be pasteurized being at least around 1,000 l/hr, the apparatus comprising:

a pasteurizing heat exchanger for exchanging heat between the flow of liquid product and a flow of fluid, preferably water, so as to heat or cool the liquid product during the passage thereof through the pasteurizing heat exchanger first conduit means for introducing the flow of liquid product at a product inlet temperature into an inlet of the pasteurizing heat exchanger, second conduit means for introducing the flow of fluid at a fluid inlet temperature into the pasteurizing heat exchanger, third conduit means for discharging the flow of liquid product from an outlet of the pasteurizing heat exchanger at a product outlet temperature, and control means for controlling the rate of flow of the flow of liquid product and/or said product inlet temperature and/or the rate of flow of the flow of fluid and/or said fluid inlet temperature and/or said product outlet temperature such that the flow of liquid product takes up the majority of the Pasteurizing Units, PU's, required for obtaining a desired degree of pasteurization during the passage of said flow of liquid product through the pasteurizing heat exchanger.

Hereby, an apparatus is provided allowing correct pasteurization of the product under all operational conditions including anomalous conditions such as stoppages and re-starts.

Advantageously, said majority is at least 51% of said desired amount of PU's, preferably at least 55%, more preferably at least 60%, even more preferably at least 65%, even more preferably at least 70%, even more preferably at least 75%, even more preferably at least 80%, even more preferably at least 85%, even more preferably at least 90% and even more preferably at least 95%.

In a currently preferred embodiment, the apparatus according to the invention further comprises:

one or more additional pasteurizing heat exchangers, all the heat exchangers being arranged in series and having intermediate conduits for conducting the flow of liquid product from the outlet of one pasteurizing heat exchanger to the inlet of the succeeding pasteurizing heat exchanger, and control means for controlling the rate of flow of the flow of liquid product through the series of pasteurizing heat exchangers and/or said product inlet temperature of at least the first of the heat exchangers in said series and/or the rate of flow of the flow of fluid through at least one and preferably all the heat exchangers in said series and/or said fluid inlet temperature of the flow of fluid introduced into at least one and preferably all the heat exchangers in said series and/or said product outlet temperature of at least the last of the heat exchangers in said series such that the entire flow of liquid product takes up a majority of the Pasteurizing Units, PU's, required for obtaining a desired degree of pasteurization during the passage of said liquid product through said series of pasteurizing heat exchangers, said majority advantageously being at least 51% of said desired amount of PU's, preferably at least 55%, more preferably at least 60%, even more preferably at least 65%, even more preferably at least 70%, even more preferably at least 75%, even more preferably at least 80%, even more preferably at least 85%, even more preferably at least 90% and even more preferably at least 95%.

Furthermore, in the currently preferred embodiment of the apparatus according to the invention, the lengths of said intermediate conduits are substantially as short as possible so as to minimize the volume of liquid product that is not in heat exchange relationship with a flow of fluid, and advantageously, the apparatus further comprises:

one or more heat recuperating or regenerative heat exchangers for exchanging heat between the unpasteurized liquid product flowing through said first conduit means into the one or more pasteurizing heat exchangers and the pasteurized liquid product flowing through said third conduit means from the one or more pasteurizing heat exchangers so as to cool the pasteurized liquid product, pre-heat the unpasteurized liquid product to product inlet temperature and recuperate heat energy from the pasteurized liquid product, the lengths of said first and third conduit means extending between the one or more pasteurizing heat exchangers and the one or more regenerative heat exchangers being substantially as short as possible so as to minimize the volume of liquid product that is not in heat exchange relationship with a flow of said fluid.

The invention further relates to an apparatus for pasteurizing a flow of a liquid product consisting of beer, milk, milk products, fruit juice, fruit juice products or similar consumable liquids, the amount of such liquid product to be pasteurized being at least around 1,000 l/hr, the apparatus comprising:

a pasteurizing heat exchanger for exchanging heat between the flow of liquid product and a flow of fluid, preferably water, so as to heat or cool the liquid product during the passage thereof through the pasteurizing heat exchanger, first conduit means for introducing the flow of liquid product at a product inlet temperature into an inlet of the pasteurizing heat exchanger, second conduit means for introducing the flow of fluid at a fluid inlet temperature into the pasteurizing heat exchanger, third conduit means for discharging the flow of liquid product from an outlet of the pasteurizing heat exchanger at a product outlet temperature, one or more heat recuperating or regenerative heat exchangers for exchanging heat between the unpasteurized liquid product flowing through said first conduit means into the pasteurizing heat exchanger and the pasteurized liquid product flowing through said third conduit means from the pasteurizing heat exchanger so as to cool the pasteurized liquid product, pre-heat the unpasteurized liquid product to product inlet temperature and recuperate heat energy from the pasteurized liquid product, the lengths of said first and third conduit means extending between the pasteurizing heat exchanger and the one or more regenerative heat exchangers being substantially as short as possible so as to minimize the volume of liquid product that is not in heat exchange relationship with a flow of said fluid.

Preferably, the apparatus according to the invention further comprises one or more additional pasteurizing heat exchangers comprising the features of the above mentioned pasteurizing heat exchanger, all the pasteurizing heat ex-changers being arranged in series and having intermediate conduits for conducting the flow of liquid product from the outlet of one pasteurizing heat ex-changer to the inlet of the succeeding pasteurizing heat exchanger, and the lengths of said intermediate conduits being substantially as short as possible so as to minimize the volume of liquid product that is not in heat exchange relationship with a flow of fluid.

The invention furthermore concerns an apparatus for the pasteurizing of liquid products in a continuous flow, the apparatus consisting of:

a regenerative part into which the product is fed by a supply pump, and a pasteurizing part to which the product is led from the regenerative part and from which pasteurizing part the product is led back to the regenerative part, both the regenerative part and the pasteurizing part consisting of heat exchangers.

The invention also concerns a method for the pasteurizing of liquid products in a continuous flow and comprising the following steps:

providing a regenerative part of a pasteurizing apparatus and a pasteurizing part of said pasteurizing apparatus, both the regenerative part and the pasteurizing part consisting of heat exchangers, feeding product into the regenerative part, leading the product from the regenerative part to the pasteurizing part, leading the product from the pasteurizing part back to the regenerative part, heating the product in the regenerative part by transfer of heat from the product led back to the regenerative part from the pasteurizing part.

In the manufacture of products which can be spoiled by bacteria, especially within the foodstuffs industry, it is commonly known to destroy the bacterial flora by pasteurization, which is a heat treatment which kills the harmful bacteria by exposing them to higher temperatures than they can tolerate.

The effect of the pasteurization is measured in PU and depends on the temperature which is used, and on the time for which the product is exposed to this temperature.

However, the product is also damaged by intense heating, and demands are therefore placed on the heat treatment with regard to time and temperature.

Such a pasteurization of a continuous flow of a liquid product is known e.g. from the brewing industry, in the form of beer or similar products which must later be containerised, for example in bottles.

The product to be pasteurized can either be pasteurized before it is transferred to smaller containers, or after the containers have been filled.

The following description deals only with a pasteurization process which takes place before the product is transferred to smaller containers, a so-called plate pasteurization.

The product flow through a plate pasteurization apparatus will normally take place in the following manner: The product flows into a plate heat exchanger's regenerative part, where energy is exchanged between the cold product on the way in and the hot already-pasteurized product on its way out. The product is thus first heated in the regenerative section, after which it is pumped into the next section of the heat exchanger where it is heated to the pasteurization temperature.

The product is now led out into a "holding pipe", the length and flow rate through which is determinative of the pasteurization time. Out of regard for space, the holding pipe is often configured as elongated spiral. When the product has passed through and reaches the end of the holding pipe, the product has been pasteurized and it is led into the second chamber in the regenerative part of the heat exchanger, where it is cooled down to the discharge temperature by the cold product flowing into the heat exchanger.

The pasteurized product can now be filled into a container. In order to adjust the capacity between the filling plant and the pasteurization apparatus, there is often introduced a flow-control valve and a buffer tank.

Moreover, use can be made of a cooler if it is desired to further reduce the discharge temperature.

A stop in production can occur if other machines, such as e.g. the filling plant or the bottling machine are stopped. A stop in the production line is a problem for a plate pasteurization apparatus, which is dependent on a continuous process in order to achieve the correct processing. During a stoppage, the product in the holding pipe, which has the pasteurization temperature, will not have the possibility of being cooled down.

Consequently, the product becomes over-pasteurized and will normally be discarded before the line is re-started.

A second problem is to achieve the correct temperatures when the line is re-started. The regenerative section will have the average temperature between the cold and the hot product, while at the same time the supply of heat to the heating section is closed down. Therefore, the "new" product must be discarded until the temperature is correct, or it must be replace by water which is also discarded.

These circumstances result in a loss of resources and not least in a delay in the re-starting of the production. Therefore, the above-mentioned buffer tank will often be introduced after the plate pasteurization apparatus. This buffer tank will normally be capable of containing up to half an hour's production, and can hereby reduce the number of stoppages of the plate pasteurization apparatus.

Another way in which this problem can be solved is to provide the plate pasteurization apparatus with a by-pass. Compared with the simple plate pasteurization apparatus, here there is introduced an extra valve which can open for the circulation, so that the pasteurized product can again be used as input to the plate pasteurization apparatus. The function of the cooler during the by-pass is to cool the pasteurized product down to the normal input temperature, so that the temperature balance is maintained through the whole of the plate pasteurization apparatus.

The result is that the same product is pasteurized again and again and therefore becomes over-pasteurized. For this reason, the plate pasteurization apparatus will often be filled with water just before it goes into by-pass. Before re-starting, the water must again be replaced by the product. This procedure takes time and results in a great consumption of water and a certain product wastage, which means that a large buffer tank after the plate pasteurization apparatus is necessary in order to reduce the number of times the production line is stopped.

The use of a by-pass also has the result that during a stoppage, continuous use is made of the same energy for heating as during operation. Moreover, a corresponding energy is used for the cooling of the product or the water which is circulated.

It is therefore the object of the invention to provide a method for avoiding the disadvantages of space-demanding equipment and resource demanding procedures and to avoid product wastage by over-pasteurization.

This object is achieved by a method of the kind disclosed in the introduction, said method according to the invention being characterized in heating the product to the pasteurization temperature in the pasteurizing part and cooling the product down in the pasteurizing part in the event of a production stop by supplying hot or cold water, respectively, to the pasteurizing part, and controlling the pasteurization process by means of temperature sensors placed before and after the pasteurizing part.

By this method it is ensured that pasteurization can take place without a great waste of the product and of substitution water and a high consumption of energy during an operational stoppage, in that during the stoppage it is not necessary to replace the product with water. At the same time, it is also ensured that no under-pasteurization of the product occurs, and that over-pasteurization is limited to the greatest possible extent.

The method also ensures that it is possible for production to take place without a buffer tank between the pasteurization apparatus and the filling machine, or with a possible buffer tank with very small volume.

The invention also concerns an apparatus for execution of the method and of the kind disclosed in the introduction, said apparatus according to the invention being characterised in that it further comprises a mixing valve for supplying hot or cold water to the pasteurizing part, so that the pasteurizing part cannot only heat the product to the pasteurization temperature, but also cool the product down in the event of a stop in production, and temperature sensors placed before and after the pasteurizing part for controlling the pasteurization process.

This apparatus results in a considerable saving in space, in that despite the introduction of a further heat exchanger, space is saved for both holding pipe and for the buffer tank. Moreover, since there is no continuous consumption of energy for heating and cooling during a stop in production, a saving in energy is achieved.

Furthermore, a more simple cleaning of the apparatus is achieved, i.e. Central Inplace Cleaning, in that the construction does not include extra pipe loops or pipe ends without flow. Moreover, the buffer tank is very small or can be omitted completely, which all-in-all will save large amounts of CIP liquids and CIP-installations.

BRIEF DESCRIPTION OF THE DRAWINGS

In the following, the methods and the apparatus according to the present invention will be described more in detail by way of example only and with reference to the accompanying drawings where:

FIG. 13 is a table showing values for beer temperature, PU-uptake, heat treatment, number of finite elements and end-of-zone positions.

DETAILED DESCRIPTION OF THE INVENTION

Figure 1:
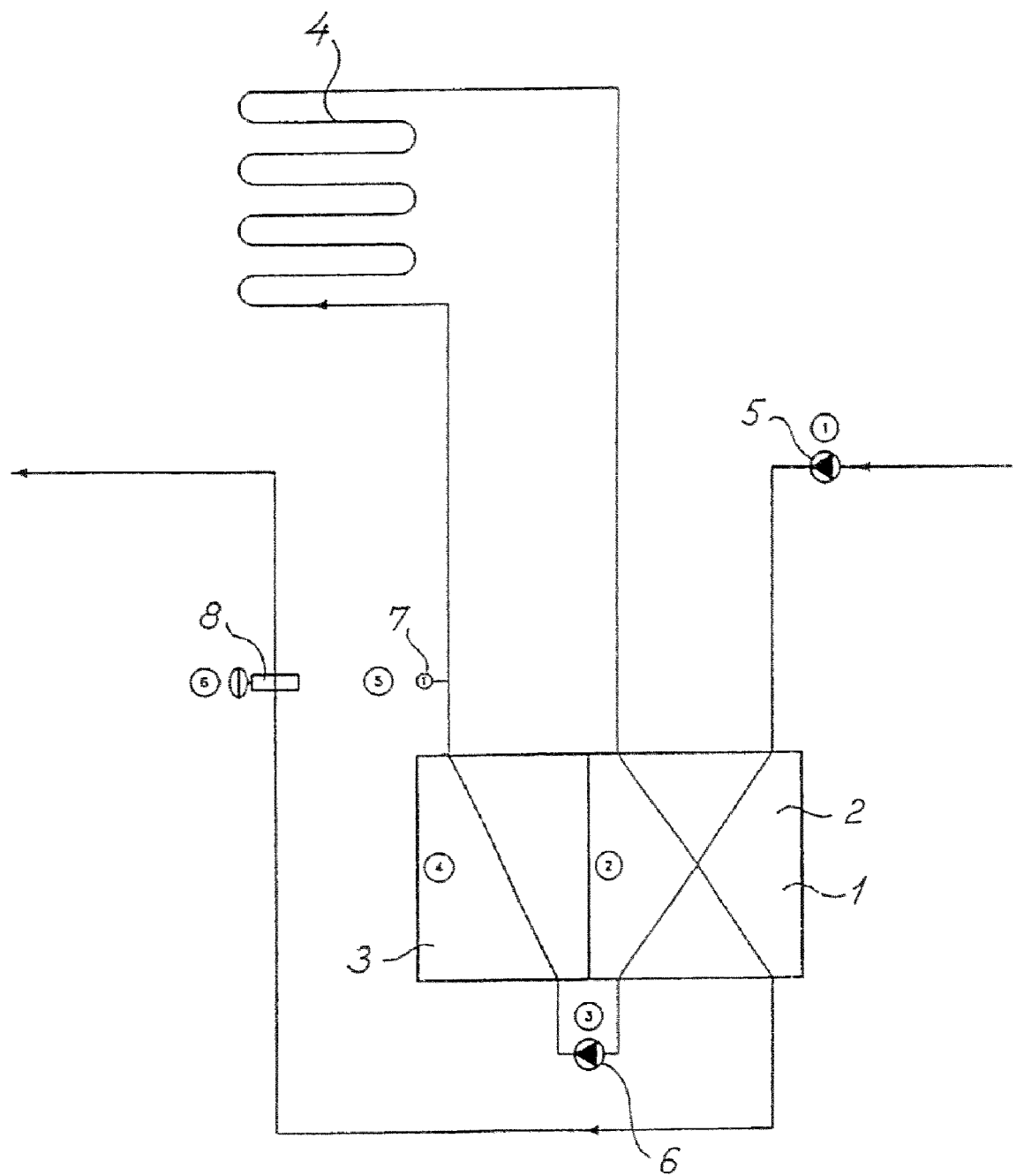
FIG. 1 shows a diagrammatic view of a conventional pasteurizer for liquid products such as beer.

Referring now to FIG. 1, the illustrated plate pasteurizer comprises a plate heat exchanger consisting of two sections, a regenerative or heat recuperating section 2 and a heating section 3. The plate pasteurizer further comprises a so-called holding pipe 4, a liquid product feed pump 5, a booster pump 6, a temperature sensor 7, a flow control valve 8, a not shown buffer tank and a not shown filling apparatus for filling the pasteurized liquid product into containers. Hot water is supplied to the heating section 3 of the plate heat exchanger in a not shown manner such that heat exchange may take place between the hot water and the liquid product in the section 3. The cold liquid product is supplied to the regenerative section 2 by means of the feed pump 5, and hot pasteurized liquid product is also supplied to the regenerative section 2 in counter-flow with the cold unpasteurized liquid product so that the cold liquid product is pre-heated and the hot pasteurized product is cooled by recuperating the heat from the hot product and transferring it to the cold product.

The thus pre-heated product is transferred to the heating section 3 by means of the booster pump 6, and the product is heated up to a pre-determined pasteurizing temperature by means of heat exchange in section 3 with the hot water supplied in counter-flow to said section. The temperature of the heated product supplied to the holding pipe 4 is monitored by the temperature sensor 7 so that the pre-determined temperature of the heated product may be maintained by altering the temperature of the hot water supplied to the heating section as a function of the rate of flow of the product through the pasteurizer. The length of the holding pipe 4, which often is configured as an elongate helix, together with the rate of flow and the temperature of the heated product will determine the amount of pasteurizing units, PU's, that is taken up by the product during its passage through the holding pipe.

When the product exits the holding pipe 4 it is assumed to have taken up the required amount of PU's for the degree of pasteurization desired. The product is conducted into the regenerative section 2 where it is cooled to the exit temperature by transferring heat to the cold product in counter-flow. The pasteurized product may then be transferred to the filling station to be filled into containers.

To coordinate the capacity of the filling station with tie capacity of the pasteurizer, the flow control valve 8 and the not shown buffer tank are utilized.

If a production stop occurs, for instance if other machines such as the filling station or a succeeding packing station stops, this constitutes a problem for the conventional pasteurizing apparatus shown in FIG. 1 which is dependent on a continuous process to achieve the correct heat treatment of the product.

During stop there will be no possibility of cooling the product in the holding pipe 4 and therefore the product therein will remain at the pasteurizing temperature. The product will therefore be over-pasteurized and will normally be discarded before re-starting the pasteurizer.

Another problem is to attain the correct temperatures of the product and in the rest of the system during re-start. The regenerative section 2 has the average temperature between the cold and the hot product at the same time that heat supply to the heating section 3 is closed down. Therefore, the "new" product must be discarded until the temperature measured by the temperature sensor is correct, or alternatively, the product must be replaced by water which is also discarded.

The above causes waste of resources and, not least, delays re-start of the production. These problems can be reduced by utilizing a buffer tank with a large capacity after the plate pasteurizer. If the buffer tank, as is normal, contains up to 30 minutes of production, the number of stops of the pasteurizer may be reduced. However, the size of the buffer tank may not be very large because of space constraints and loss of the contents thereof at the end of the working day.

This conventional pasteurizer furthermore has a very simple system for controlling the amount of PU's taken up by the liquid product. The PU-control system consists in measuring the temperature at the inlet of the holding pipe by means of the temperature sensor and supposing that all the liquid product in the pasteurizer will be treated correctly. If one or more portions of the product have been under-pasteurized, for instance in connection with a stop, the control system will have no possibility of reacting to ensure that all portions of the liquid product have received the required amount of PU's. It is very important that all portions of the product be pasteurized correctly, as otherwise serious quality problems will arise.

Figure 2:
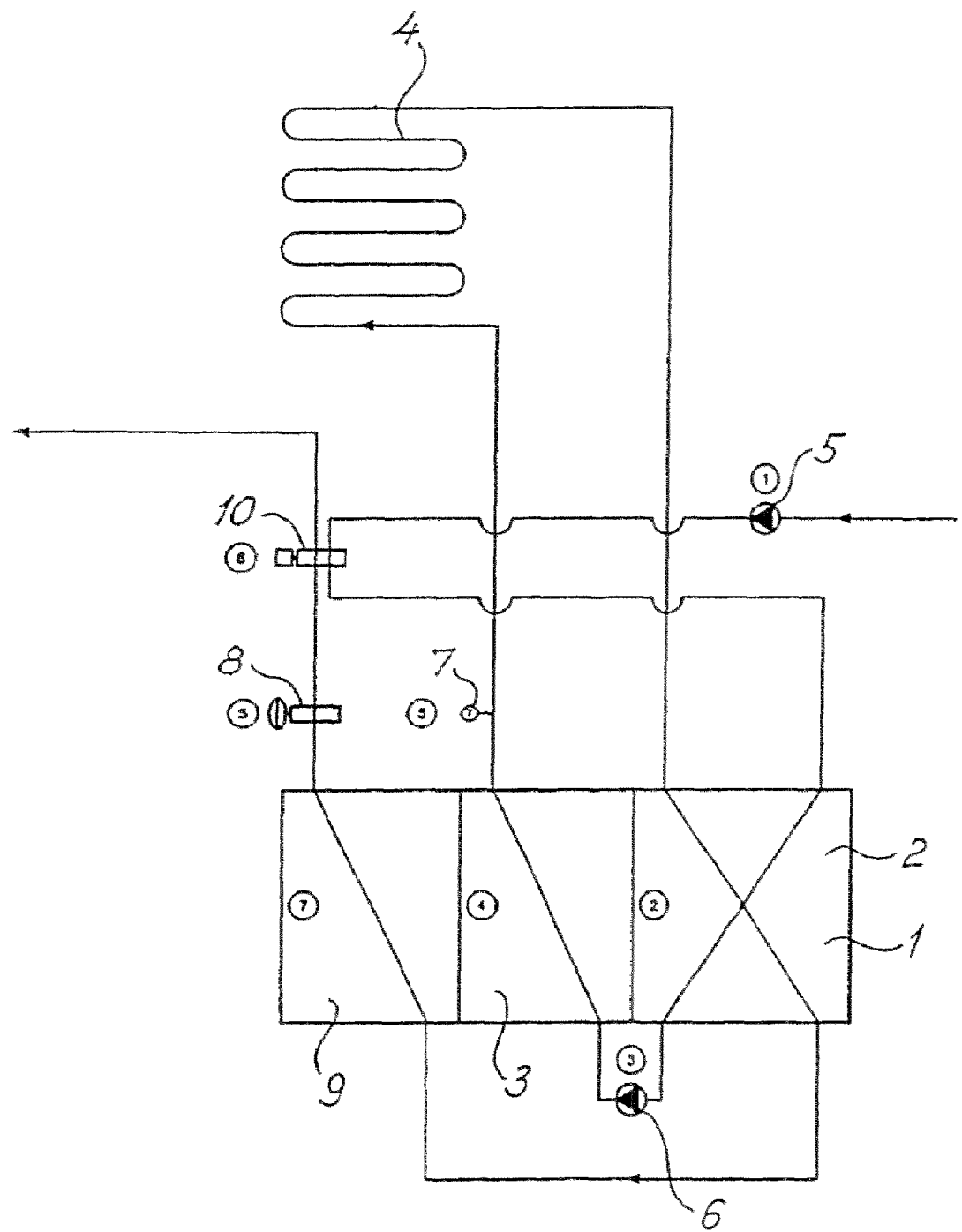
FIG. 2 shows a similar view of another conventional pasteurizer for liquid products such as beer.

Referring now to FIG. 2, the pasteurizer 1 comprises a regenerative section 2, a heating section 3, a holding pipe 4, a feed pump 5, a booster pump 6, a temperature sensor 7 and a flow-control valve 8. This pasteurizer further comprises a cooling section 9 and a bypass valve 10. The bypass valve 10 may open for circulation such that the pasteurized product exiting from the cooling section 9 may be used as input to the pasteurizer again.

During bypass the function of the cooling section 9 is to cool the pasteurized product down to the normal input temperature such that the temperature balance through the entire pasteurizer may be maintained. This entails that the same product is pasteurized again and again and therefore becomes over-pasteurized. Therefore, the pasteurizer will often be filled with water just before it is stopped. Before re-start, the water is to be replaced by the product again. This procedure takes time and entails a large consumption of water. Therefore it is necessary to have a quite large buffer tank after the pasteurizer to reduce the number of stops of the pasteurizer.

The bypass furthermore entails that during a stop the same energy as during normal operation is used to heat and additional corresponding energy is used to cool the product or the water that is being circulated.

This pasteurizer with bypass has the same simple PU-control system as the pasteurizer shown in FIG. 1 and therefore it has the same disadvantages.

In connection with such heat exchanger pasteurizers having a holding pipe wherein the pasteurization takes place, a PU-control system may be based on the following suppositions:

The temperature is constant during the whole course of the pasteurizing treatment.

The region of the pasteurizer wherein PU's are taken up by the liquid product, i.e. the holding pipe, is constant so that the volume of the product taking up PU's is constant.

When suppositions 1.1 and 1.2 are complied with and when the temperature T and the flow are known, the PU-uptake can be calculated according to the following equation:

$$PU = \text{volume}/\text{flow} * \exp((T-X)/Z),$$

where X and Z are constants.

The PU's taken up, the temperature and the rate of flow are controlled in three control loops:

The level in the buffer tank is compared with the desired value for the level. The desired rate of flow is calculated by means of a regulator.

Based on the desired rate of flow, the desired PU's and the constant treatment volume, a desired temperature is calculated. The temperature is altered very slowly so as to maintain supposition 1.1, i.e. that the temperature is constant throughout the entire holding pipe.

The rate of flow is regulated such that the error between the calculated and the desired PU-uptake is minimized, i.e. the rate of flow is increased to reduce PU-uptake or the rate of flow is decreased to increase the PU-uptake.

This control system is based on averages and cannot compensate for anomalies in the operation or anomalous conditions in connection with a stop-page or a re-start so that no security is to hand that all portions of the liquid product have taken up the desired amount of PU's. In connection with pasteurizing of beer where over-pasteurization is quite detrimental to the quality of the beer as regards taste, it is desirable to ensure that the required amount of PU's is taken up without over-pasteurizing the rest of the beer more than absolutely necessary.

This is an important aspect of the present invention whereby it is ensured that all portions of the liquid product to be pasteurized have received the desired amount of PU's without subjecting the rest of the liquid product being pasteurized to more over-pasteurization than absolutely necessary.

Figure 3:
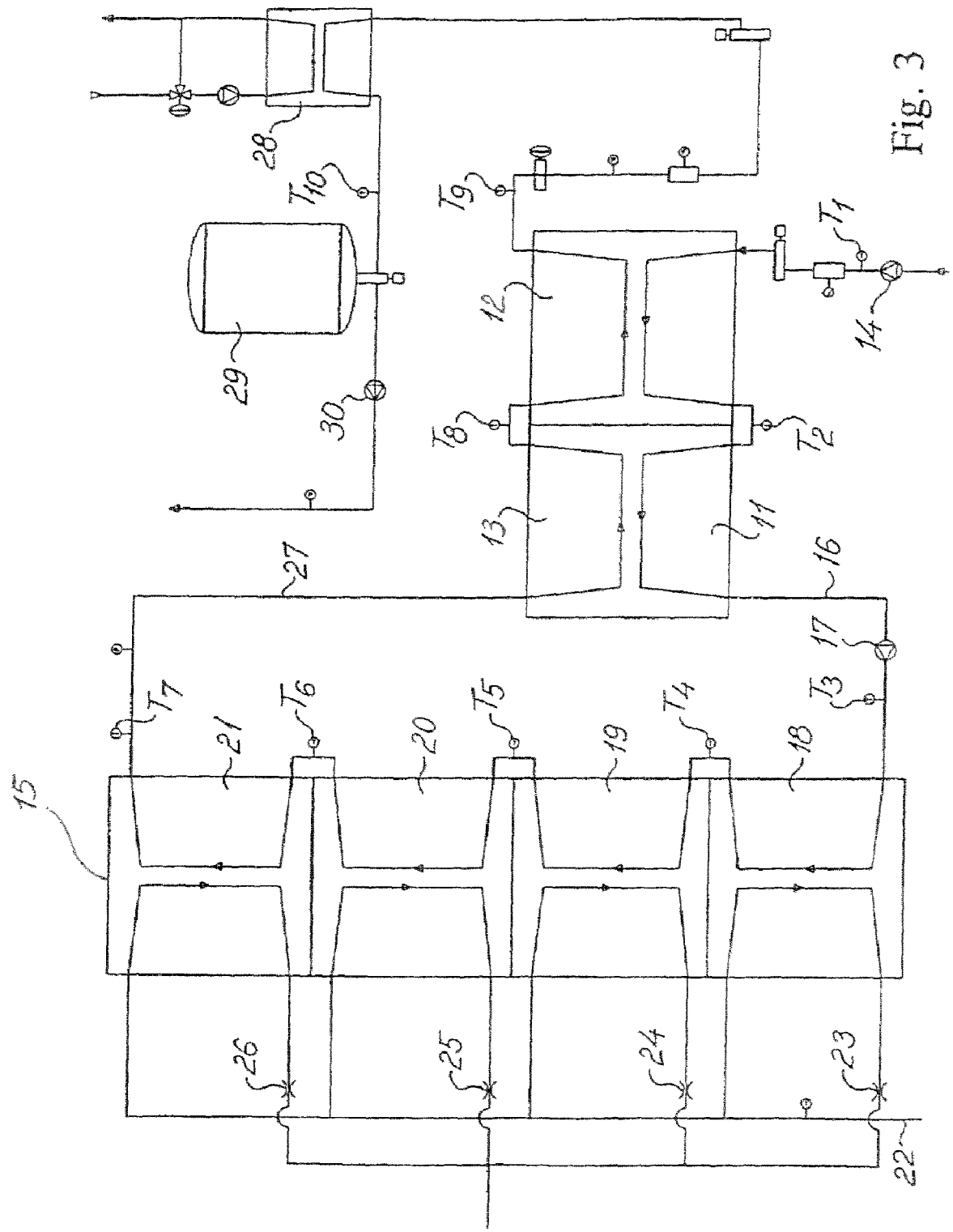
FIG. 3 shows a diagrammatic view of an embodiment of a pasteurizer according to the invention, the view being simplified so as to render the principle of the invention more clear, FIGS. 4-5 taken together show a diagrammatic view of an embodiment similar to the one shown in FIG. 3, but more in detail and showing more of the elements comprised by the pasteurizer and forming part of the monitoring and control system for PU uptake according to the invention, FIGS. 4 and 5 being intended for being viewed together by matching the references A and B in the two Figures.
Figure 4:
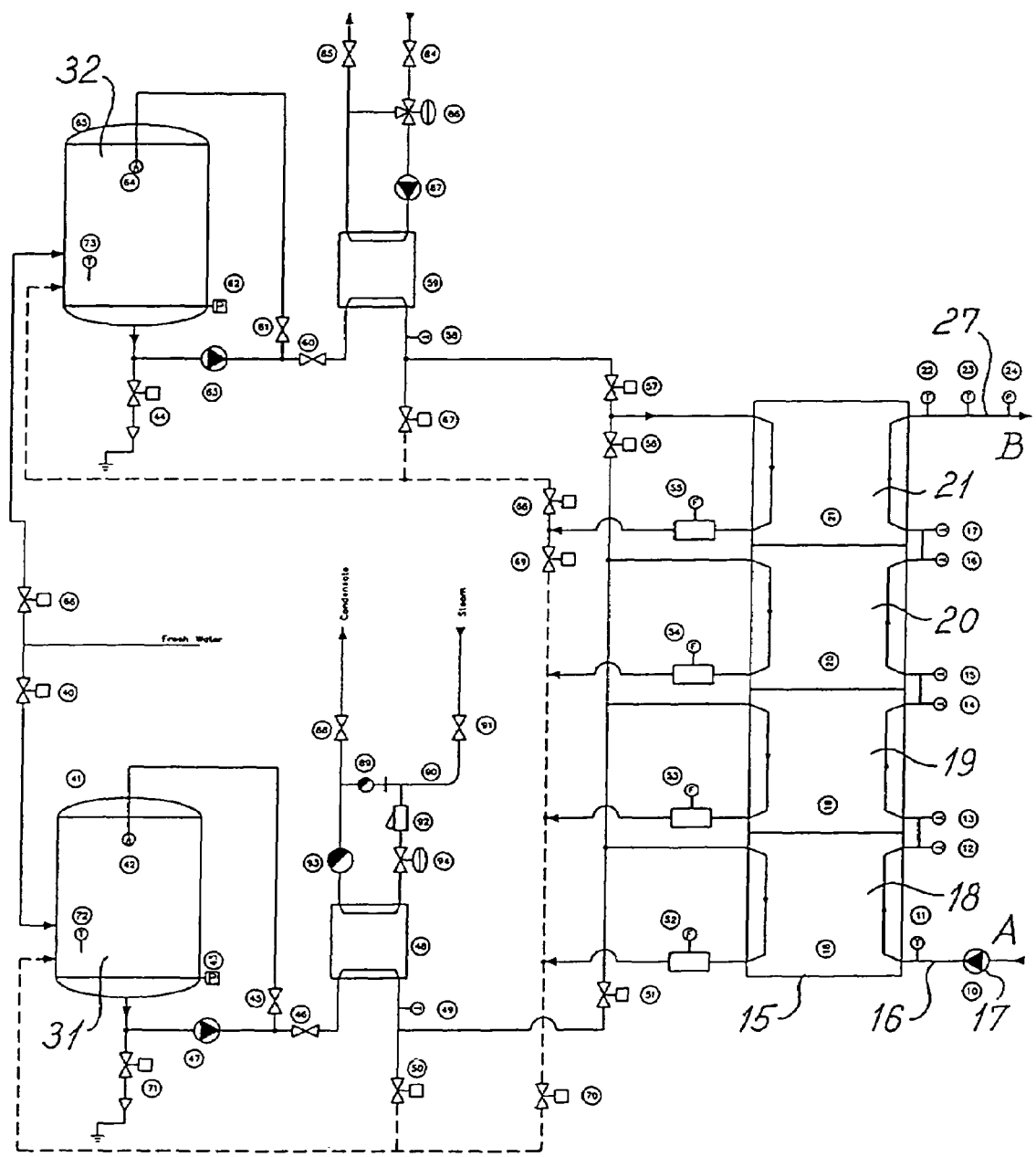
Figure 5:
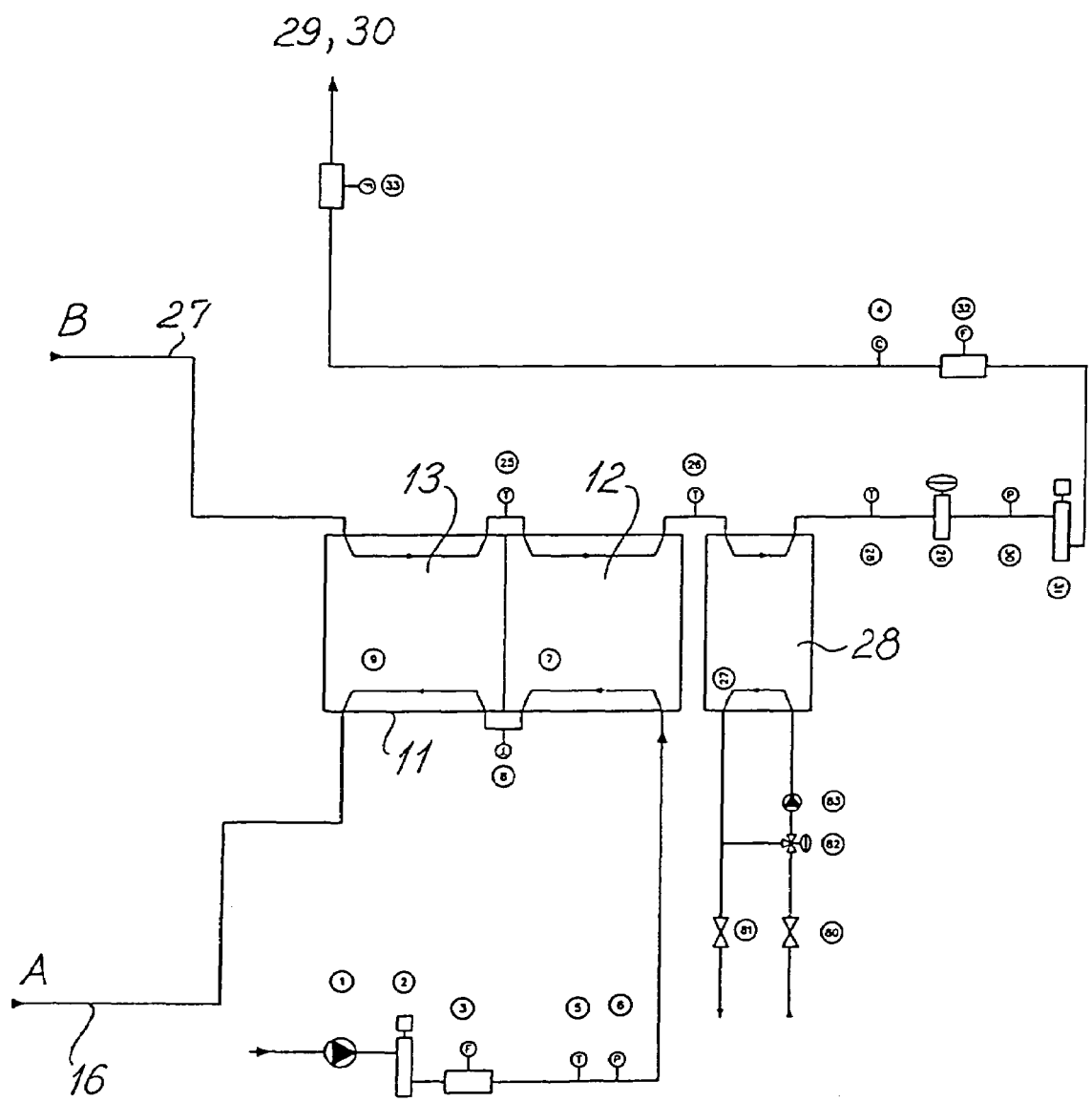

Referring now to FIG. 3 and to a certain extent to FIGS. 4-5, the pasteurizer according to the present invention comprises a heat recuperating or regenerative heat exchanger 11 comprising two zones 12 and 13 into which cold beer is introduced by means of a feeding pump 14, the cold beer being pre-heated in zones 12 and 13 of the regenerative heat exchanger 11 by exchanging heat with hot pasteurized beer flowing in counter-flow through the heat exchanger 11. The pre-heated beer is conducted to a pasteurizing heat exchanger 15 through a conduit 16 by means of a booster pump 17.

The pasteurizing heat exchanger comprises four double stroke plate heat exchanger sections 18-21 arranged in series. Each of the sections 18-21 is connected to supplies of hot and cold water from not shown sources of hot and cold water through a conduit 22. The hot and cold water flows through the sections 18-21 so as to heat or cool, respectively, the beer flowing in counter-flow thereto. Throttle valves 23-26 regulate the flow of either cold or hot water through each of the sections 18-21, respectively.

The heated and pasteurized beer is transferred from the outlet of the pasteurizing heat exchanger section 21 to an inlet of the regenerative heat exchanger zone 13 by means of a conduit 27. The cool beer leaves an outlet of the regenerative plate heat exchanger zone 12 and is directed to a cooling heat exchanger 28 wherein the beer is cooled to a temperature suitable for being filled into containers. From the cooling heat exchanger 28 the cool beer is transferred to a beer buffer tank 29 and from the beer buffer tank by means of an output pump 30 to a not shown filling device.

The conduit 16 and especially the conduit 27 are as short as possible so that the volume of beer in a region without possibility of regulating the temperature of the beer is kept to a minimum. It is especially important that the connecting conduit between the pasteurizing section 21 and the regenerating section 13 is as short as possible because the temperature of the beer is highest here.

Contrary to all the known pasteurizing devices, the pasteurizer according to this invention has no holding tube in which the pasteurizing takes place. It could be argued that the conduits 16 and 27 are short holding tubes, but according to the invention the function of a holding tube in conventional pasteurizers is not desirable in the pasteurizer according to the invention for the reasons set out above.

Even though a small proportion of the required PU's is taken up by the beer in the regenerating heat exchanger section 13, the great majority of the PU's taken up by the beer takes place in the pasteurizing heat exchanger 15 where the temperature can be regulated both upwards and downwards such that, as will be explained in the following, a PU-control system can be implemented, that can ensure that all portions of the beer flow have taken up the required amount of PU's.

If the conditions during operation, during a stoppage or during a re-start after a stoppage require a regulation of the temperature of the beer in the pasteurizing heat exchanger 15, the temperature of the beer may be regulated by heating or cooling the beer in the sections 18-21 as is required by the PU-control system chosen for a particular application.

In broad terms, during normal operation anomalies may occur giving rise to variations in the flow-rate of the beer which will require a fine-tuning of the temperatures in the sections 18-21, or a total stop of the operation may be required because of for instance stoppage of the filling station and excessive filling of the buffer tank 29, and this latter situation requires more radical regulation of the temperature of the beer in various parts of the pasteurizer. When re-starting after a stop or at the beginning of a working day, more radical regulation of the temperature of the beer must also take place.

All the necessary regulations of the temperature of the beer can be carried out by supplying either hot water or cold water to various or all of the pasteurizing heat exchanger sections 18-21 and/or by varying the rate of flow of the beer. When a stoppage occurs, it is for example necessary to cool the beer in the pasteurizing heat exchanger according to a certain procedure, the simplest procedure being to cool the beer in all the sections 18-21 by supplying cold water to the sections so as to cool the beer therein.

Another procedure could be to continue the flow of beer for a small period of time corresponding to the volume of beer in the last pasteurizing heat exchanger section 21 and solely cooling the beer in said section 21. Thereby cooler beer that does not take up PU's is transferred to the regenerator section 13 and no over-pasteurization of this volume will take place.

If the stop is of a longer duration, a cooling of the sections 20-18 takes place to a temperature reducing or totally eliminating the uptake of PU's in said sections so as to avoid over-pasteurization in said sections. It will be clear to those skilled in the art that many different PU-control procedures may be applied depending on the circumstances, the duration of the stoppage, reduced capacity of the filling station etc.

When re-starting after a stop or a sharp reduction in the flow rate of the beer, various strategies may be adopted because of the various possibilities of regulating the temperature in the pasteurizing sections 18-21.

Normally, the first pasteurizing section 18 will be heated to a higher temperature than under normal operation so as to ensure that a sufficient number of PU's may be taken up by the first portion of beer pasteurized after a stop. However, this depends on the temperature of the beer in the rest of the pasteurizer sections 19-21 and other factors such as allowable flow and therefore different strategies may be adopted or a combination of strategies may be adopted so as to ensure that all portions of the beer has taken up the required amount of PU's.

Referring now to FIGS. 4 and 5, a more detailed view of the pasteurizing apparatus according to the invention shown in FIG. 3 is illustrated, there also being a difference as regards the flow regulation of cold and hot liquid to the four pasteurizer sections 18-21. The difference consists in that in the embodiment according to FIGS. 4-5 hot water may be supplied from a hot water tank 31 to the zones 18-20 simultaneously or to zones 18-21 simultaneously while cold water may be supplied from a cold water tank 32 either to all zones 18-21 or solely to zone 21.

In the following a list is given of the various positions of the various elements shown in FIGS. 4-5, the position number being indicated by a numeral in a circle, the corresponding explanation as regards function and capacity being given including an item No. which refers to the same type of element, for instance item No. 13 is a temperature sensor with a maximum of 75° C.

| | Flow Positions | | |
|---|---|---|---|
| Pos | PosName | | Item |
| 1 | Feeding pump | 2 | Beer Pump, 200 hl/h, 9,2 bar |
| 2 | Pressure Isolation | 3 | Shut off Valve |
| 3 | Infeed flow | 1 | Flow Meter, beer 0-200 hl/h |
| 4 | Conductivity | 30 | Conductivity Sensor |
| 5 | T supply | 13 | PT100 Sensor, Tmax = 75° C. |

-continued

Flow Positions

| Pos | PosName | Item | |
|---|---|---|---|
| 6 | Infeed Pressure | 10 | Pressure sensor 0-10 bar |
| 7 | Reg. 1/8 | 4 | Heat Exchanger, Regenerative A = 35 m2 |
| 8 | T Zone 1 | 13 | PT100 Sensor, Tmax = 75° C. |
| 9 | Reg. 2/7 | 4 | Heat Exchanger, Regenerative A = 35 m2 |
| 10 | Booster Pump | 5 | Beer Pump, 200 hl/h, 2,2 bar |
| 11 | T Zone 2 | 13 | PT100 Sensor, Tmax = 75° C. |
| 12 | T Zone 3 | 13 | PT100 Sensor, Tmax = 75° C. |
| 13 | Tref Zone 3 | 13 | PT100 Sensor, Tmax = 75° C. |
| 14 | T Zone 4 | 13 | PT100 Sensor, Tmax = 75° C. |
| 15 | Tref Zone 4 | 13 | PT100 Sensor, Tmax = 75° C. |
| 16 | T Zone 5 | 13 | PT100 Sensor, Tmax = 75° C. |
| 17 | Tref Zone 5 | 13 | PT100 Sensor, Tmax = 75° C. |
| 18 | Zone 3 (past) | 7 | Heat Exchanger, Pasteurizing |
| 19 | Zone 4 (past) | 7 | Heat Exchanger, Pasteurizing |
| 20 | Zone 5 (past) | 7 | Heat Exchanger, Pasteurizing |
| 21 | Zone 6 (past) | 7 | Heat Exchanger, Pasteurizing |
| 22 | T Zone 6 | 13 | PT100 Sensor, Tmax = 75° C. |
| 23 | Tref Zone 6 | 13 | PT100 Sensor, Tmax = 75° C. |
| 24 | Past. Pressure | 10 | Pressure sensor 0-10 bar |
| 25 | T Zone 7 | 13 | PT100 Sensor, Tmax = 75° C. |
| 26 | T Zone 8 | 13 | PT100 Sensor, Tmax = 75° C. |
| 27 | Output cooler | 21 | Heat Exchanger Glycol/Beer |
| 28 | T output | 13 | PT100 Sensor, Tmax = 75° C. |
| 29 | Beer flow control | 9 | Control Valve, Beer |
| 30 | Pressure sensor | 10 | Pressure sensor 0-10 bar |
| 31 | Pressure Isolation | 3 | Shut off Valve |
| 32 | Flow out | 1 | Flow Meter, beer 0-200 hl/h |
| 33 | Filler Flow | 1 | Flow Meter, beer 0-200 hl/h |
| 40 | Fresh Water to hot tank | 14 | Ball Valve, On/Off |
| 41 | Hot Water Buffer Tank | 16 | Tank, Water, 10 hl, Open |
| 42 | Cleaning Nozzle | 31 | Tank Cleaning Nozzle |
| 43 | Hot Water Level | 32 | Tank Level (Pressure) |
| 44 | Drain Cold Tank | 14 | Ball Valve, On/Off |
| 45 | Clean Hot Tank | 37 | Manual Ball Valve |
| 46 | Shut off Hot Water | 37 | Manual Ball Valve |
| 47 | Water pump | 17 | Pump, Water, 1200 hl/h, 2 bar |
| 48 | HE Hot Water | 18 | Heat Exchanger, Steam/water. |
| 49 | T Water | 13 | PT100 Sensor, Tmax = 75° C. |
| 50 | Hot by-pass | 14 | Ball Valve, On/Off |
| 51 | Heating all zones | 14 | Ball Valve, On/Off |
| 52 | Flow zone 3 | 38 | Flow meter for water 0-1000 hl/h |
| 53 | Flow zone 4 | 38 | Flow meter for water 0-1000 hl/h |
| 54 | Flow zone 5 | 38 | Flow meter for water 0-1000 hl/h |
| 55 | Flow zone 6 | 38 | Flow meter for water 0-1000 hl/h |
| 56 | Cooling all zones | 14 | Ball Valve, On/Off |
| 57 | Cooling Zone 6 | 14 | Ball Valve, On/Off |
| 58 | T Cold Water | 13 | PT100 Sensor, Tmax = 75° C. |
| 59 | Heat Exchanger Glycol/Water | 26 | Heat exchanger, Glycol/Water |
| 60 | Shut off Hot Water | 37 | Manual Ball Valve |
| 61 | Clean Hot Tank | 37 | Manual Ball Valve |
| 62 | Cold Water Level | 32 | Tank Level (Pressure) |
| 63 | Cold Circulation Pump | 17 | Pump, Water, 1200 hl/h, 2 bar |
| 64 | Cleaning Nozzle | 31 | Tank Cleaning Nozzle |
| 65 | Cold Water Buffer Tank | 16 | Tank, Water, 10 hl, Open |
| 66 | Fresh Water to cold tank | 14 | Ball Valve, On/Off |
| 67 | Cold by-pass | 14 | Ball Valve, On/Off |
| 68 | Cold return Zone 6 | 14 | Ball Valve, On/Off |
| 69 | Cold return all Zones | 14 | Ball Valve, On/Off |
| 70 | Hot return all zones | 14 | Ball Valve, On/Off |
| 71 | Drain Hot Tank | 14 | Ball Valve, On/Off |
| 72 | T Cold Tank | 13 | PT100 Sensor, Tmax = 75° C. |
| 73 | T Cold Tank | 13 | PT100 Sensor, Tmax = 75° C. |
| 80 | Glycol Shut Off | 37 | Manual Ball Valve |
| 81 | Glycol Shut Off | 37 | Manual Ball Valve |
| 82 | Glycol control valve | 22 | Control valve 3-way, Glycol |
| 83 | Glycol pump | 23 | Glycol circulation pump |
| 84 | Glycol Shut Off | 37 | Manual Ball Valve |
| 85 | Glycol Shut Off | 37 | Manual Ball Valve |
| 86 | Glycol control valve | 22 | Control valve 3-way, Glycol |
| 87 | Glycol Pump | 23 | Glycol circulation pump |
| 88 | Condensate Shut Off | 37 | Manual Ball Valve |
| 89 | Steam Trap | 20 | Steam Trap |
| 90 | Water Take Out, Steam | 36 | Water Take OUT, Steam |
| 91 | Steam Shut Off | 37 | Manual Ball Valve |
| 92 | Strainer Steam | 35 | Strainer for Steam |
| 93 | Steam Trap | 20 | Steam Trap |
| 94 | Steam valve | 19 | Control valve, Steam |

Those skilled in the art will readily understand the possibilities of regulating flows and temperatures on the basis of FIGS. 4-5 and the above listing of elements.

However, those skilled in the art will also readily understand that many modifications are possible as regards the number of sections or zones in the pasteurizing heat exchanger, the number of regenerative zones, the combination possibilities of supplying cold and hot water to the various zones in the pasteurizing heat exchanger and possibilities of adding special heat exchangers for special purposes.

Those skilled in the art will readily appreciate that the more temperature and flow sensors are installed in the system, the better the possibilities are of monitoring and controlling the uptake of PU's by the liquid product being pasteurized. The important features to keep in mind when modifying or supplementing the shown and described embodiments of a pasteurizing apparatus according to the invention are that the great majority of the uptake of PU's by the liquid product should take place in the pasteurizing zone, and the volume of liquid product contained in the conduits 16 and 27 leading to the regenerative zones 12 and 13 should be as small as possible.

In the following, methods according to the invention for monitoring and controlling the pasteurizing process will be explained, it being understood that said methods may be applied to many different configurations of pasteurizing apparatus according to the invention and in fact for some of the methods also to conventional pasteurizing apparatus having a holding pipe wherein the pasteurizing takes place without possibility of regulating the temperature during said pasteurization.

The methods according the invention for monitoring and controlling the uptake of PU's by the liquid product to be pasteurized are based on establishing a mathematical model of the apparatus and measuring temperatures and rates of flow at different points of the apparatus such as indicated in FIGS. 4-5 and defining a number of other points or sections of the flow-paths of the liquid product and/or the flow-paths of the heat transfer fluids. By applying the mathematical model containing parameters for the heat transfer at the different points or sections, the uptake of PU's by the volume of liquid product in said sections or points may be calculated such that the total uptake of PU's by said volumes may be monitored and controlled throughout the pasteurizing process.

Figure 6:
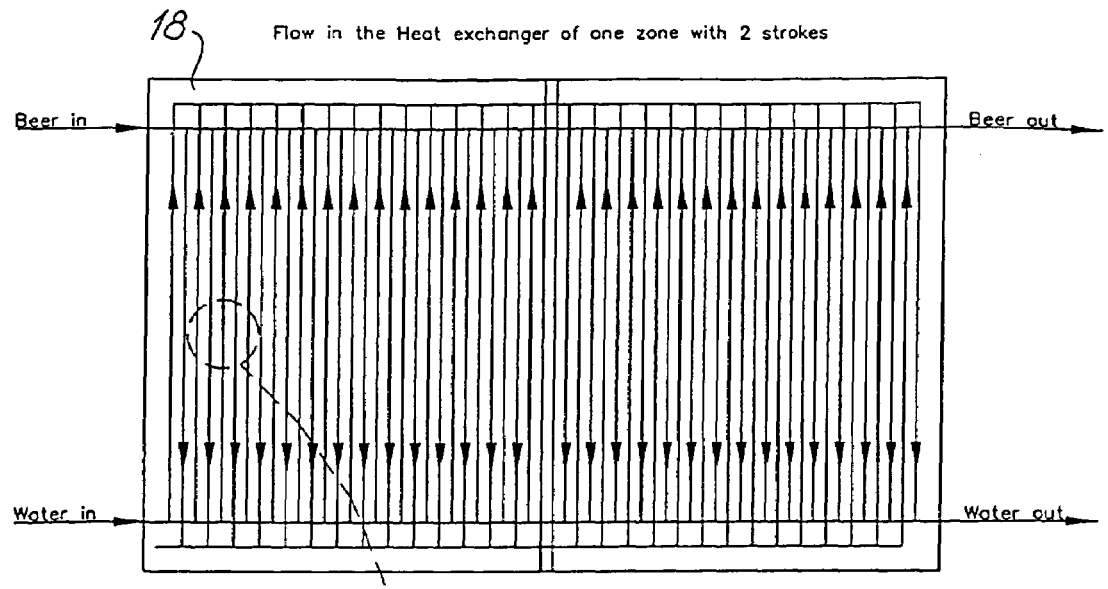
FIG. 6 shows diagrammatic vertical elevational view of a pasteurizing heat exchanger with one zone and two strokes, i.e. corresponding for example to section 18 in FIG. 3 or 4.
Figure 7:
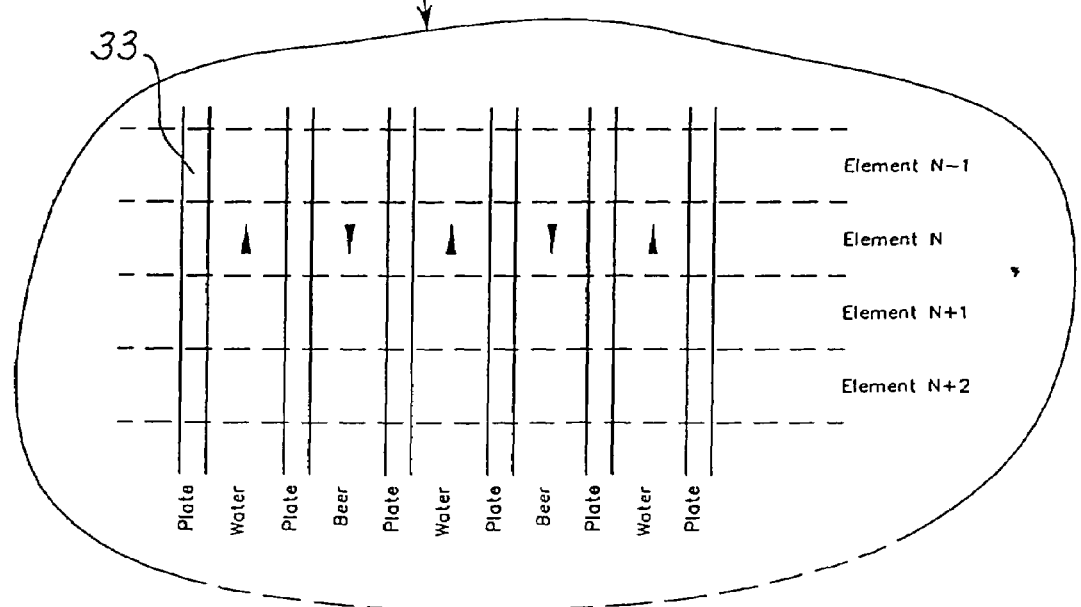
FIG. 7 shows an enlarged view of a detail of the heat exchanger in FIG. 6.

Referring now to FIGS. 6 and 7, a plate heat exchanger 18 with two strokes has channels between thin vertical plates 33 having an embossed pattern, the plates defining channels for heating or cooling water and for beer. The plate heat exchanger 18 is a well-known conventional plate heat exchanger. The beer and the water flow through the heat exchanger in mutual counter-flow so as to afford the most efficient heat exchange between the beer and the water.

For the purposes of the mathematical model mentioned above, the heat exchanger 18 is considered as consisting of a number of sections, cells or finite elements as shown in FIG. 7, where finite element n is bounded by two cross-sections through an entire stroke of the heat exchanger such that the volume in said finite element n of water and beer, respectively, is considered for that finite element. The number of finite elements into which each stroke or for that matter the entire heat exchanger may be considered as being sub-divided for the purposes of the mathematical model is chosen considering a trade-off between the accuracy of the mathematical model and the calculation of the PU-uptake for each volume of beer in each finite element and the calculating capacity of a computing means employed to perform the necessary calculation with a frequency also determined by such a trade-off.

The element n contains beer from all the beer plate spaces in one stroke and water from all the plate spaces in the same stroke as well as the stainless steel of all the plates in the stroke comprised between said boundaries. It is supposed that the temperature of the beer, of the water and of the steel plate does not vary across the stroke, i.e. that the flow of beer and water is evenly distributed in all the channels. Therefore the volumes of beer and water and steel may be added together within the boundaries of given element n.

Figure 6A:
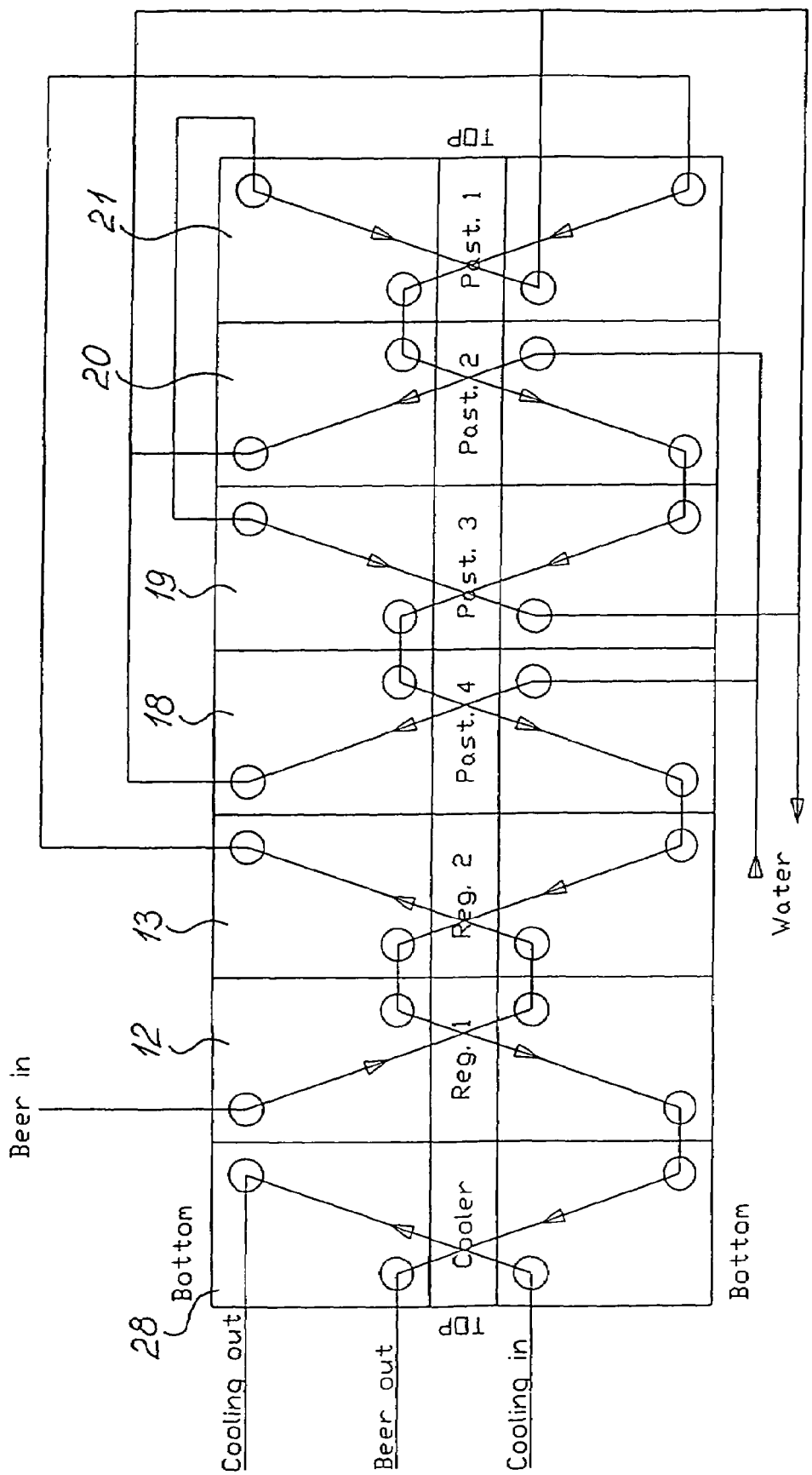
FIG. 6a shows a flow-diagram illustrating the flow paths of beer and water through a series of two-stroke heat exchangers.

Referring now to FIG. 6a, the flow of beer and water through the system of heat exchangers shown in FIGS. 3, 4 and 5 so as to illustrate the flow of water and beer through the system in another way.

Figure 8:
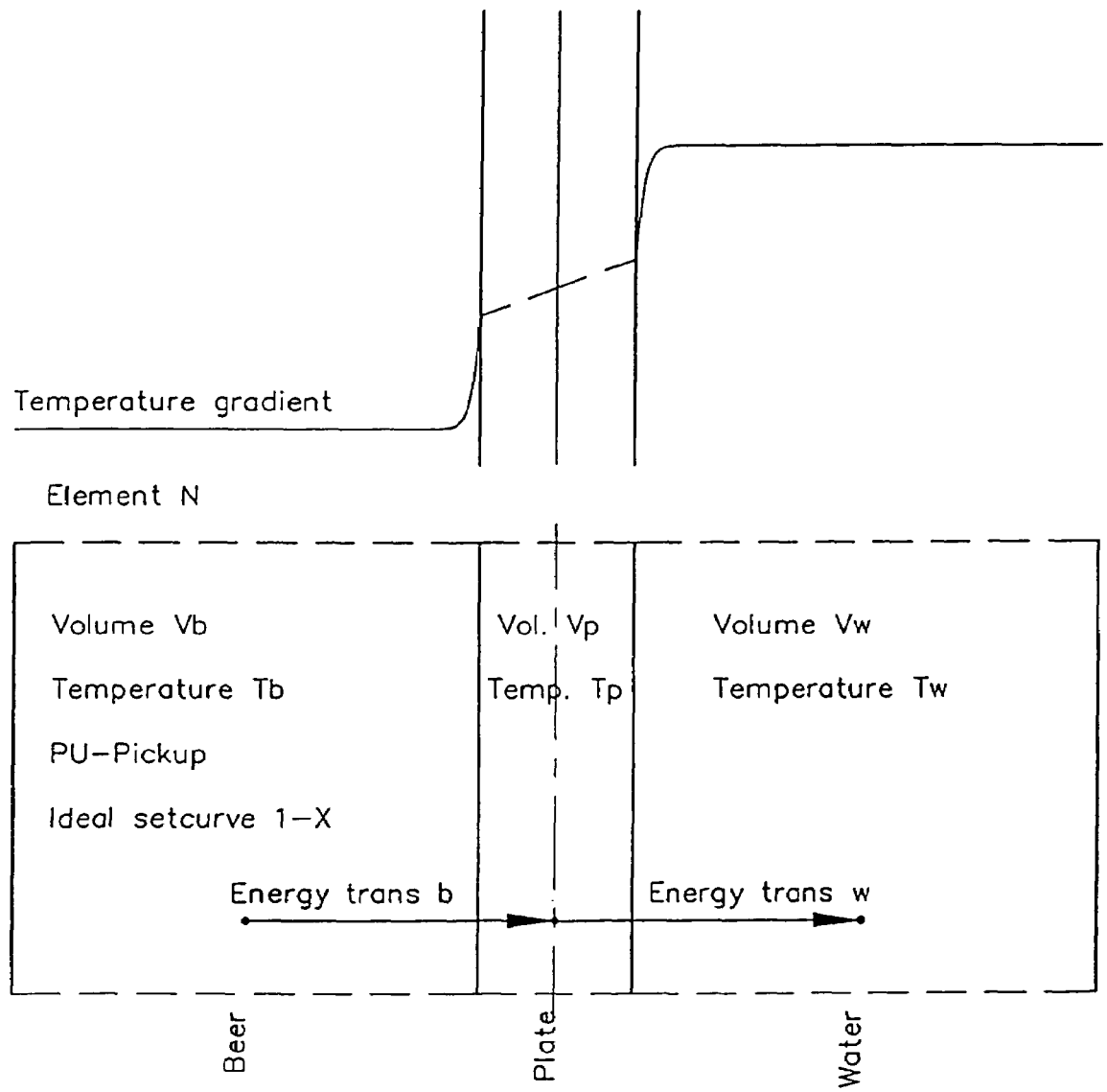
FIG. 8 is an illustration of the parameters determining the heat transfer and PU-uptake in the heat exchanger shown in FIG. 6.

Referring now to FIG. 8, the volume Vb of beer, Vp of steel plate, Vw water represents the total volume of beer, plate and water within the boundaries of element n. Therefore each calculation element is characterized by a constant beer volume (VB), water volume (VW) separated by a plate with width equal to the thickness of a single plate and an area corresponding to the areas of all the plates in the element n, as well as a heat transfer coefficient. The element has four operational data, accumulated PU-uptake (PU) for the beer, the temperature of the beer (Tb), the temperature of the water (Tw) and the temperature in the center of the plate (Tp). Each element furthermore contains the PU-values of a number of ideal PU-curves (ideal set curve 1-X) for a number of ideal curves as discussed in the following.

The heat transfer coefficient is calculated based on a supposition that both the flow of water and beer is very turbulent and thereby maintains the same temperature in the whole element. The heat transfer thus consists of a heat transmission from beer to the plate, a heat transmission through the plate to the center of the plate, a heat transmission from the center of the plate to the surface of the plate and a heat transmission to the water. This is shown by the temperature gradient uppermost in FIG. 8 and the arrows at the bottom part of FIG. 8. The heat transfer coefficient is determined by experiments as a function of beer flow-rate and water flow-rate as will be explained in the following in connection with the explanation of the "adaptive adjustment of the heat transfer coefficient".

The calculation of the operational data in the elements is updated for each sample (calculation cycle). The calculation is to be performed as often as necessary to be able to suppose that the heat transmission is constant, i.e. that the temperatures only change slowly compared to the frequency of sampling or calculation.

After each calculation/sample the liquid and fluid volumes are moved a number of finite elements in the flow direction corresponding to the measured flow and the frequency of calculation/sampling. The calculated number of elements that the volumes are to be moved in the flow-direction is rounded up or down to the closest integral number. The error introduced by this rounding up or down is stored and is added to a next calculation before said calculation is rounded up or down, and so on.

The calculation is carried out as follows for each finite element and for each sample/calculation:

Calculate the heat transmission from beer to plate based on the start temperatures.

Calculate the heat transfer from the plate to water based on the start temperatures.

Calculate the total energy transmission in the course of one sample (3.1 and 3.2 are assumed to be constant during the sampling period).

Calculate PU-uptake and add same to the accumulated value of PU-uptake for the finite element in question.

Calculate the PU-error as the difference between the actual PU-value and an ideal PU-value.

Calculate the new temperatures of the beer, the water and the plate.

Move the beer (Th, PU) and the water (Tw) a number of finite elements in the flow-direction thereof corresponding to the respective flow-rates thereof.

The above calculation sequence is repeated for each element and for each sample.

In this manner data is constantly generated for allowing monitoring of the PU-uptake of all the volumes defined by the finite elements n such that various strategies for controlling the pasteurizing process may be implemented.

The "adaptive adjustment of the heat exchange coefficients" mentioned above takes place as described in the following.

The heat transfer coefficient can be determined by operating the pasteurizing apparatus while adjusting the heat transfer coefficient with the purpose of minimizing the difference between the calculated and the measured output temperatures at the discharge of each heat exchanger. Manual adjustment of the heat transfer coefficient can be done during commissioning or at any time in order to minimize the errors. Adaptive adjustment (auto tuning) can be done during normal operation or in a specially designed start-up sequence. The purposes of a regular adaptive adjustment of the heat exchange coefficients are:

Adapt to any minor changes in the system due to scaling, wear etc.

In case of a major change in the coefficients, the system will go into alarm mode.

The development over time will provide information about necessary cleaning and maintenance.

Figure 9:
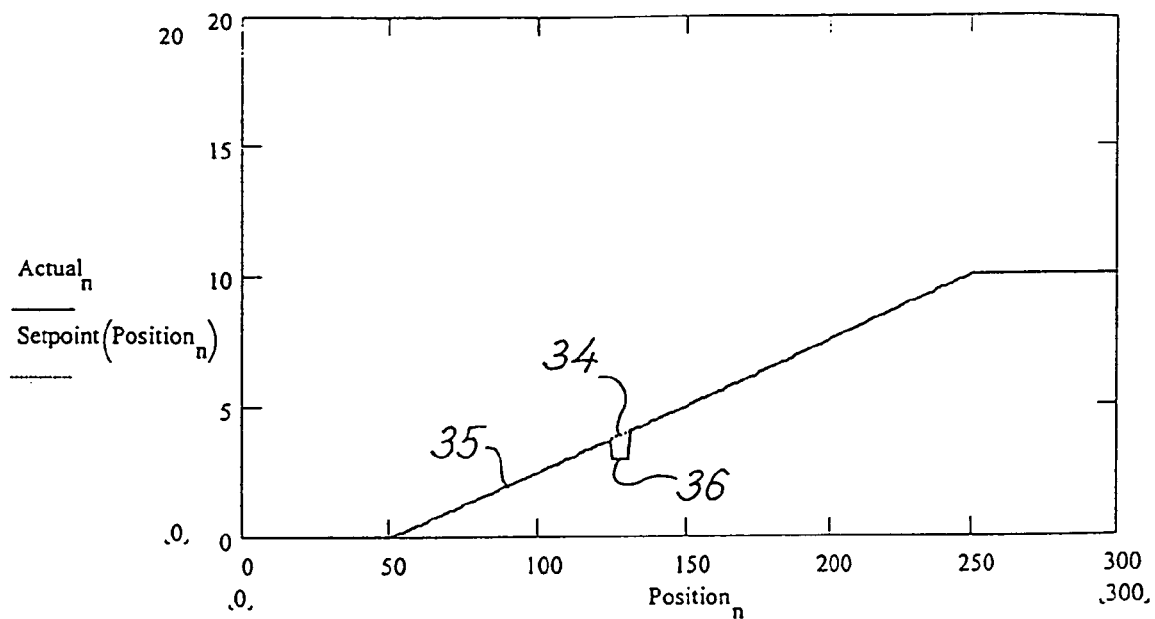
FIG. 9 is a simplified diagrammatic graph showing the result of the conventional pasteurizers' control system for controlling the uptake of PU's.
Figure 10:
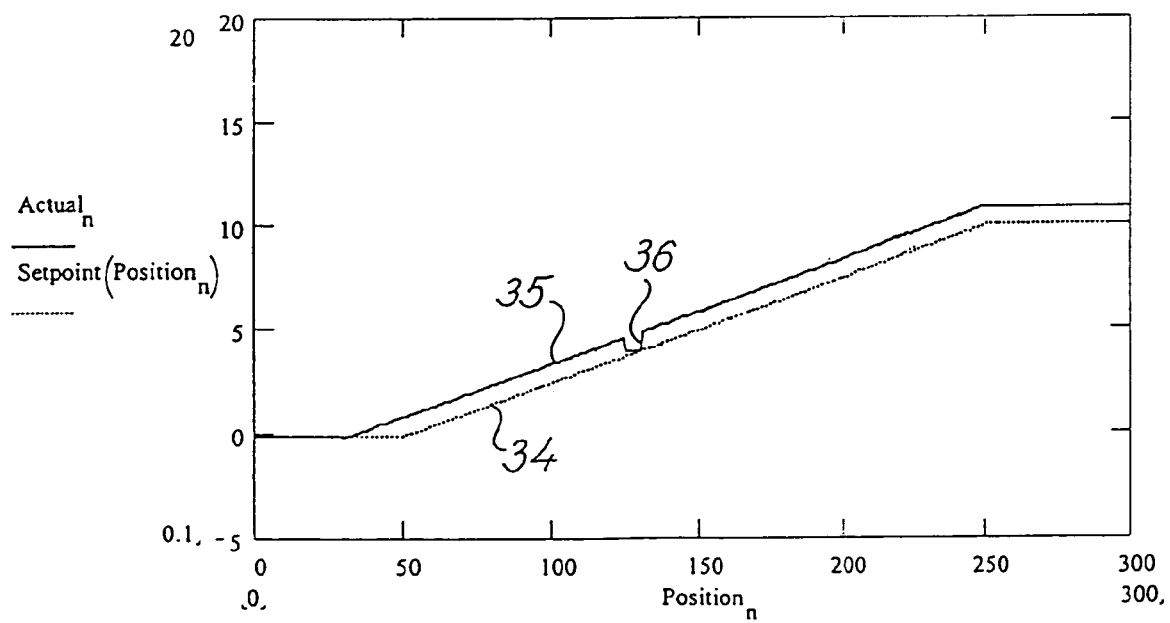
FIG. 10 is an illustration similar to FIG. 9 illustrating the result of a PU-control system according to the invention.

Referring now to FIGS. 9 and 10, the graphs therein illustrate the uptake of PU by the liquid product as a function of the position of the finite element along the flow-path of the liquid product, in this case the number of finite elements being 300. In both graphs an ideal curve 34 for the uptake of PU's as a function of the position of the portion of liquid product in question along the path flow of the liquid product is shown. The curve 35 shows the actual PU-uptake, and the dip 36 indicates a certain volume of the liquid product that has received too few PU's because of some anomaly such as a stop or a sharp reduction in flow-rate of the liquid product. In the conventional control system for conventional pasteurizers having a holding pipe, the temperature will be measured at the entrance to the holding pipe and it will be assumed that all beer in the pasteurizer will be treated correctly. If an anomaly such as 36 occurs, the control will not have any possibility to react and, as illustrated in FIG. 9, a certain volume 36 will be under-pasteurized when it exits the pasteurizer.

In the control system according to the invention, an ideal curve 34 is calculated for a given flow and the flow-rate of the liquid product and/or of the heat transfer fluid as well as the temperature thereof may be controlled such that the volume being treated having the worst discrepancy as regards PU-uptake compared with the ideal value is compensated for by increasing the PU-uptake generally in the pasteurizer with a value just sufficient to bring the volume with the worst discrepancy up to the ideal curve. The control system according to the invention will calculate that there is liquid product that does not follow the ideal curve and will for instance decrease the flow-rate thereof until the worst portion is on the ideal curve.

The ideal curve employed may be calculated or measured. The measured ideal curve can be established in the following manner.

The pasteurizer is operated with a constant flow until thermal balance is obtained and the correct PU-uptake is calculated in the simulation for the pasteurized beer. The calculated PU-uptake value and the measured treatment temperature for all the positions in the pasteurizer are stored in the computer whereby an ideal curve is established.

Alternatively a calculated ideal curve can be used, the calculated ideal curve being established by a simulation of the system or a traditional calculation of the heat transfer.

It is necessary to use different ideal curves corresponding to different flows as the shape of the curve changes with varying flow-rate. This will be explained more detailed in the following.

Figure 11:
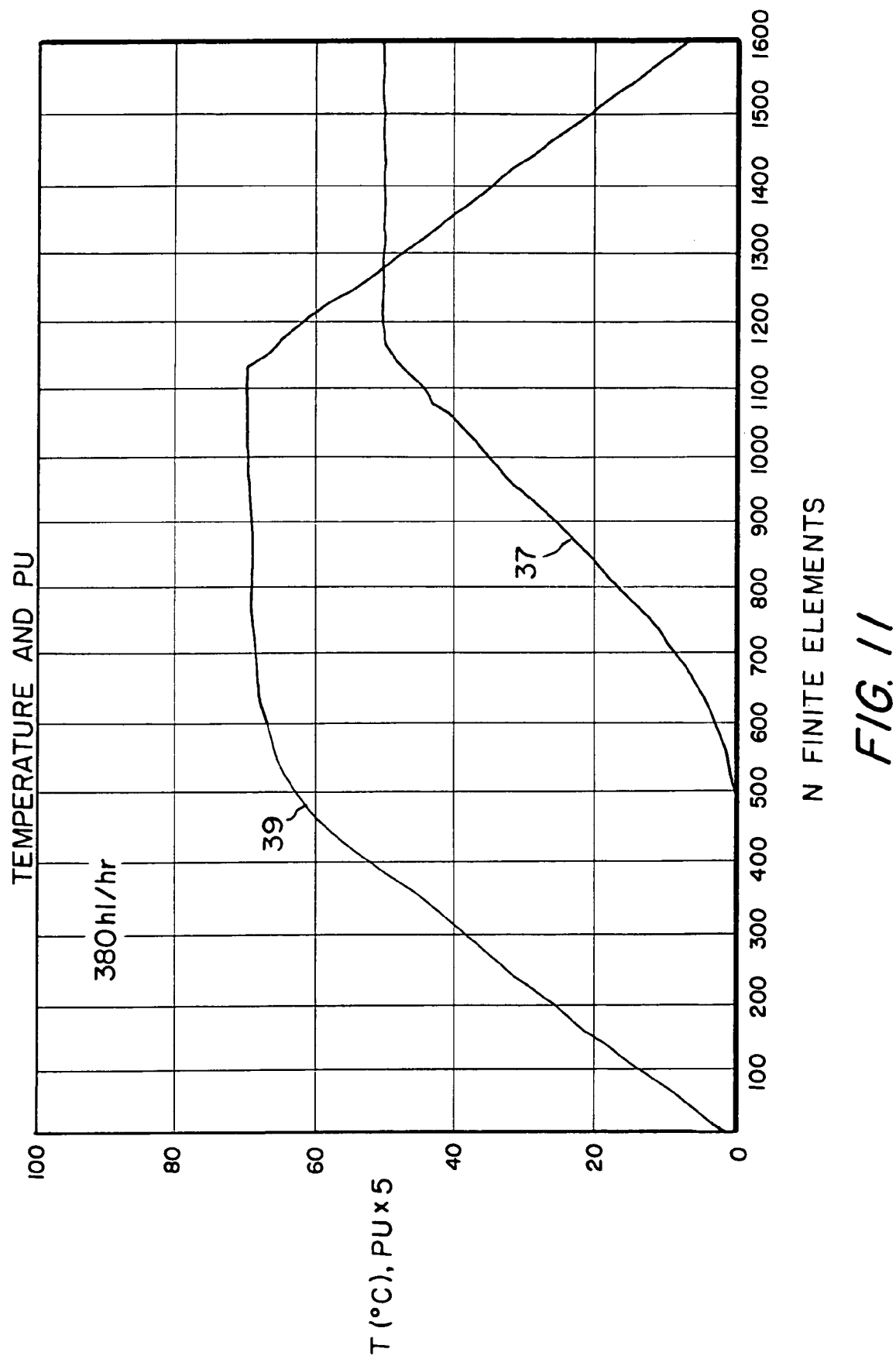
FIGS. 11 and 12 show graphs similar to FIGS. 9 and 10 for two different flow-rates of beer, FIG. 11 for 380 hl/hr and FIG. 12 for 120 hl/hr, the temperature of the beer at various positions through the pasteurizer also being shown.
Figure 12:
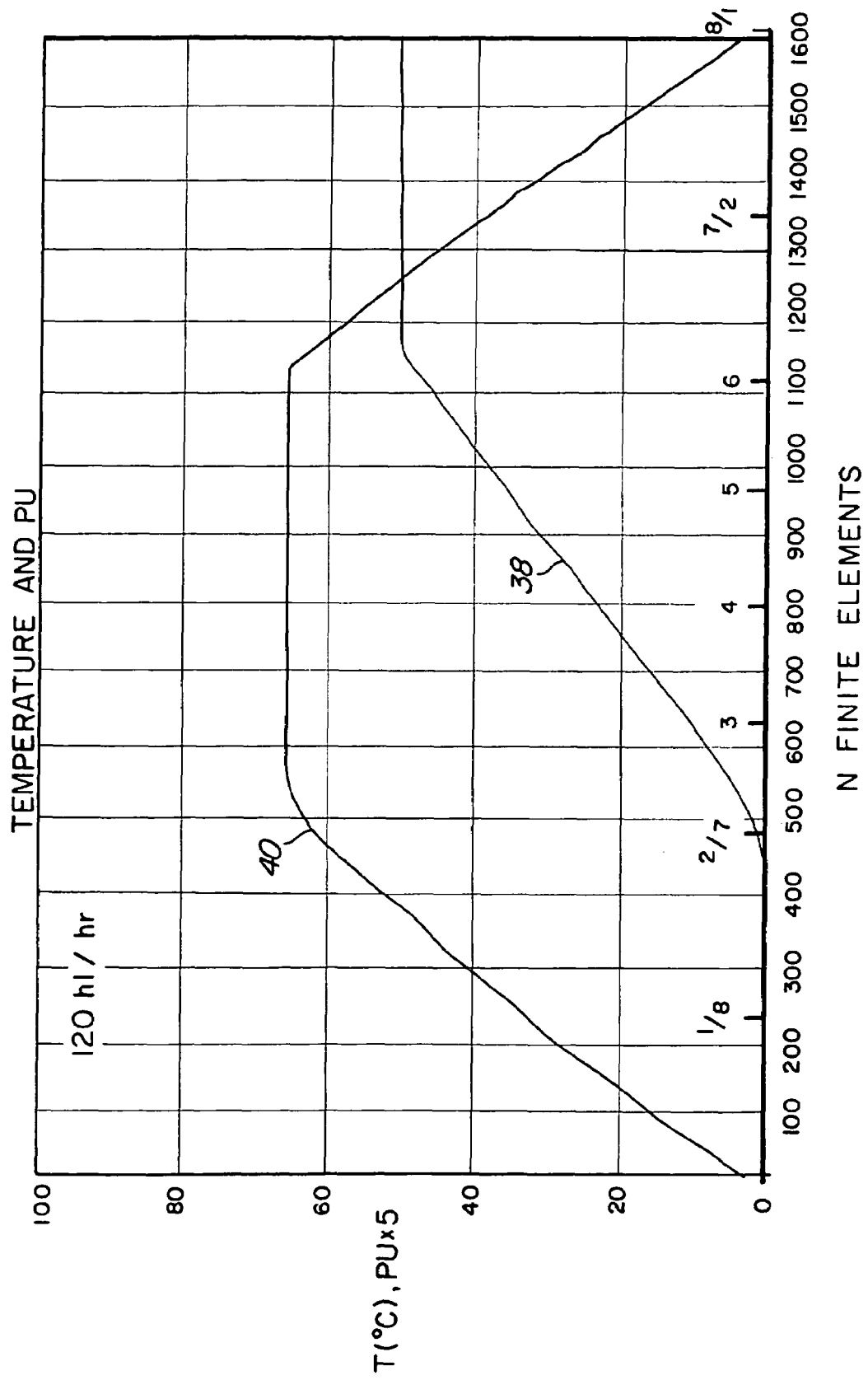

Referring now to FIGS. 11, 12 and 13, two different ideal curves for a flow-rate of 380 hl/hr and 120 hl/hr 37, 38, respectively, are shown for different positions along the flow-path of the beer to be pasteurized, the flow-path being subdivided into 1,600 finite elements. The number of PU's taken up is indicated multiplied by 5 for better clarity. The graphs also show the temperature of the beer as a function of the position along the flow-path, i.e. in each of the 1,600 finite elements. The ends of the two heating regenerating zones, the four pasteurizing zones and the two cooling regenerative zones are shown with respect to the position, i.e. the end of the first pasteurizing zone, reference No. 18 in FIGS. 3 and 4 and "past.3" in the table in FIG. 13 is positioned at position or finite element No. 640, and similarly, the temperature curves 39 and 40 in FIGS. 11 and 12, respectively, show that the temperature of the beer along the flow-path is different for different flow-rates, and consequently, the ideal curves for PU-uptake 37, 38, respectively, are also different.

The ideal curves may be calculated or measured. A measured ideal curve can be established by operating the pasteurizer with a constant flow until balance has been obtained, and the correct PU-uptakes are calculated in the simulation for the pasteurized beer. The calculated PU-uptake value and the measured heat treatment temperature (the temperature of the water flowing in) for all positions in the pasteurizer are stored in the memory of the calculator whereby an ideal curve is established. Alternatively, a calculated ideal curve can be employed, said calculated ideal curve being established by simulating the pasteurizer or by a traditional calculation of heat transmission.

For different flow-rates, a number of ideal curves and heat treatment temperatures are stored, and the ideal curve and treatment temperature corresponding to a specific flow-rate is found by interpolating between the thus established ideal curves, whether they be measured or calculated.

The table in FIG. 13 shows, as mentioned above, possible ideal curves with a nominal flow-rate of 380 hl/hr, and 120 hl/hr with a desired PU-uptake value of 10.

During stable operation at a certain flow-rate of beer, the actual PU-uptake curve for the beer will follow the ideal curve for that flow-rate. However, if for instance a stoppage occurs, several strategies may be employed. For instance the flow-rate may be reduced and the last pasteurizing zone (past.6) is cooled so that the PU-uptake level in the first three zones are raised and at the same time a colder pasteurized beer flow is created to the first cooling regenerative zone (reg.7/2) having the highest temperatures. During re-start after a stop all four pasteurizing zones (past.6) may be used to heat at constant temperature such that a "flat" curve results for ensuring that finite elements with PU-uptake values higher than the required minimum holds back the flow-rate from increasing.

As mentioned above, many different strategies may be employed depending on the situation, the number of pasteurizing zones, the required minimum PU-uptake, the character of the liquid product to be treated and so on.

Figure 14:
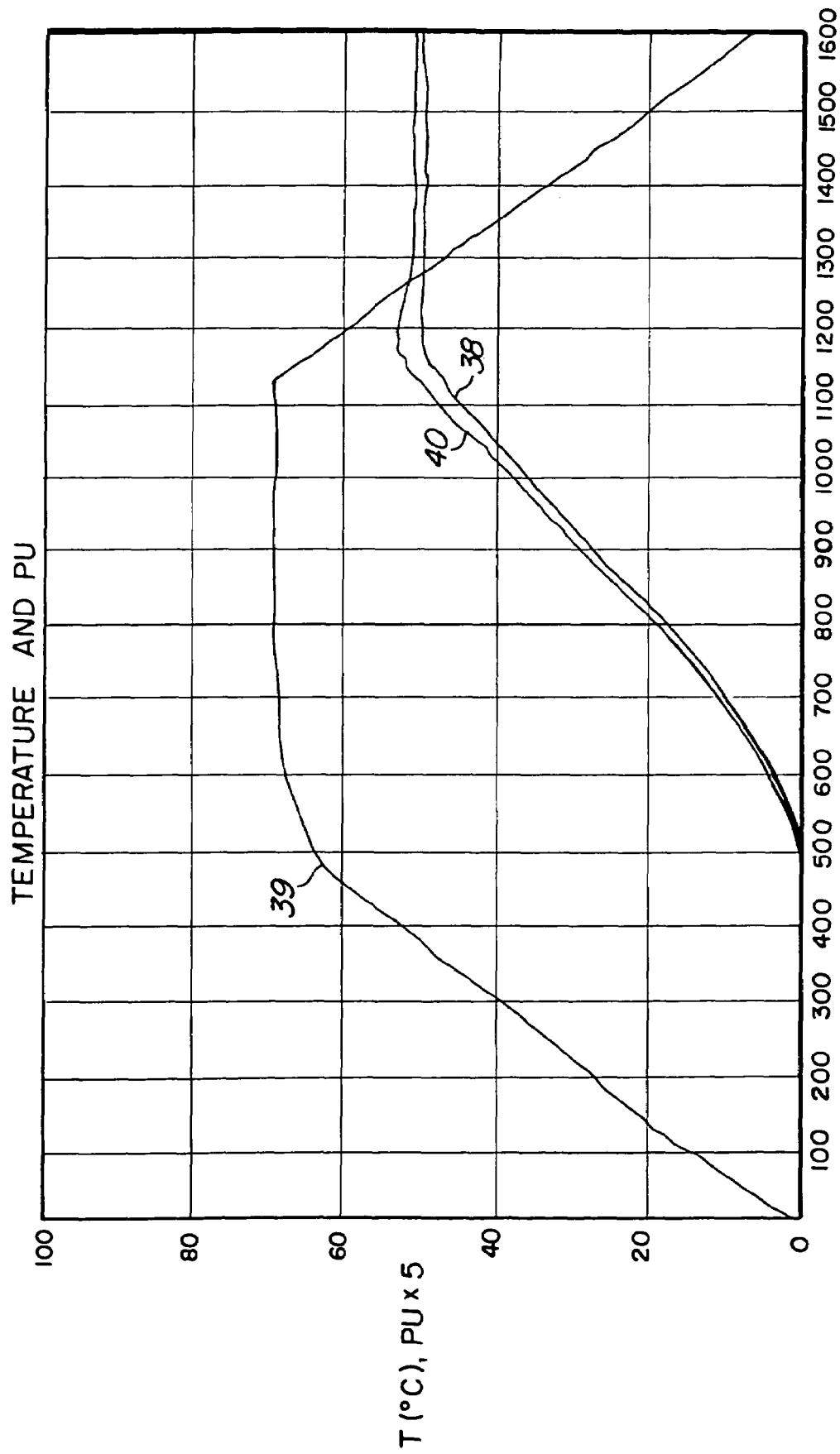
FIG. 14 is a graph similar to FIGS. 11 and 12 showing a simulated situation where an anomaly in the flow of liquid product has taken place and how the control system reacts.

Referring now to FIG. 14, the graph shows the ideal curve for a flow-rate of 380 hl/hr and the corresponding temperature curve 39. The curve 40 shows the actual uptake of PU's after the flow-rate suddenly is reduced from 380 hl/hr to 300 hl/hr. The control system is then allowed to automatically adjust for this sudden decrease in flow-rate and it can be seen from the curve 40 that the actual uptake of PU's is above the ideal curve at the outlet of the last pasteurizing heat exchanger (past.6) while the PU-uptake at the inlet to the first pasteurizing heat exchanger (past.3) is very proximate to the ideal curve. The control method or system according to the invention regulates the flow-rate of the beer and of the heat transfer fluid such that the actual PU-uptake curve 40 quickly moves back to coincide with the ideal PU-uptake curve 38.

In the following, one embodiment of control loops pertaining to the PU-uptake control method according to the invention will be described in connection with FIG. 15, which is a block diagram of three novel control loops for controlling a pasteurizer according to the invention.

Figure 15:
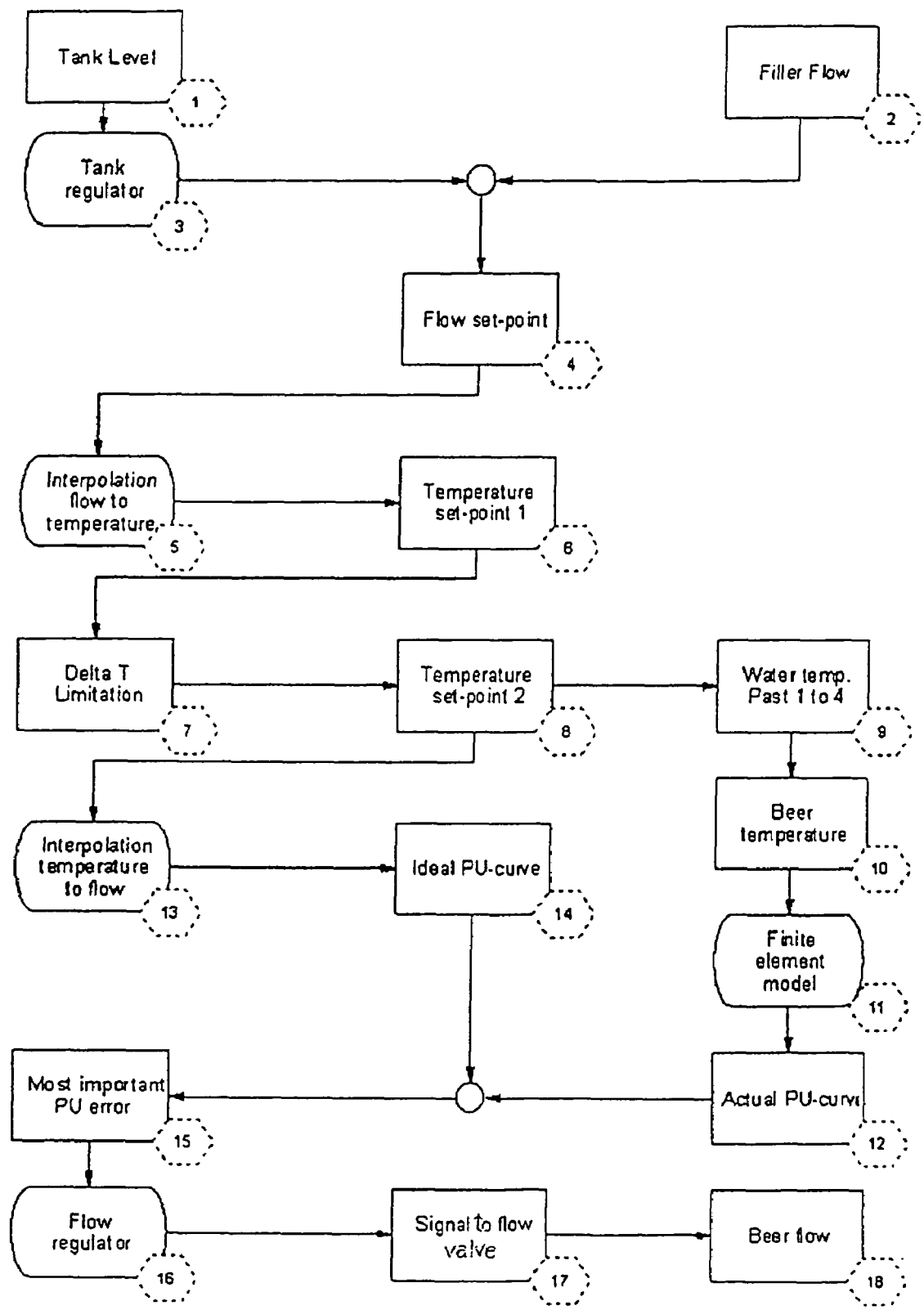
FIG. 15 shows a block diagram of control loops for controlling the PU-uptake according to the invention.

The control loops shown in FIG. 15 are applicable to the pasteurizing apparatus shown in FIGS. 4-5.

Flow Demand/Set-Point [4]:

The flow demand from the filler station [2] is added to the flow demand form the level regulator in the buffer tank [1] [3]

Temperature Set-Point 1 (optimal) [6]

From the above flow demand the control will interpolate [5] between the flow-value for the ideal curves and find the corresponding temperature, called temp set-point 1 [6].

Temperature Set-Point 2 (limited) [8]

Limitations to temperature changes [7] are made in order to ensure that the physical system can follow the setpoint 2 with a small temperature error. This is important to ensure stable temperatures and a stable PU-uptake.

Hot Water Temperature [9]

The regulator for the steam heat exchanger controls the temperature of the hot water. The set-point for the regulator is the above set-point 2 (limited) [8]

The ideal PU-curve [14] is interpolated [13] from the temperature set-point 2 (limited) in order to make the ideal curve match the actual conditions as well as possible.

The PU error [15] is found as the actual calculated value [12] minus the interpolated ideal PU-value [14].

The most important PU error [15] is the smallest value of the PU error present in the pasteurizer within the current sample time.

The beer flow [18] is controlled by a regulator [16] which uses the most important PU error (15) as input. If the most important PU error is negative, the flow is reduced and if the error is positive, the flow is increased.

Hereby an embodiment of an automatic PU-uptake control system according to the invention has been described, but as mentioned above, other possible control systems will be obvious to those skilled in the art based on the principles of the invention.

Thus, a much simpler control method could be by basing the control system on a pre-determined sequence under certain anomalous conditions while utilizing the monitoring method for PU-uptake according to the invention such that for example under a stop, a pre-determined sequence for closing down the flow of beer and cooling of the pasteurizing zone may be utilized, the sequence being developed based on a series of test runs where the finite element mathematical model is used to monitor the result and ensure that no beer is under-pasteurized. Under operation the monitoring method according to the invention based on the finite element mathematical model will also monitor the operation and give an alarm if the chosen pre-determined sequence results in under-pasteurization of the beer.

Figure 16:
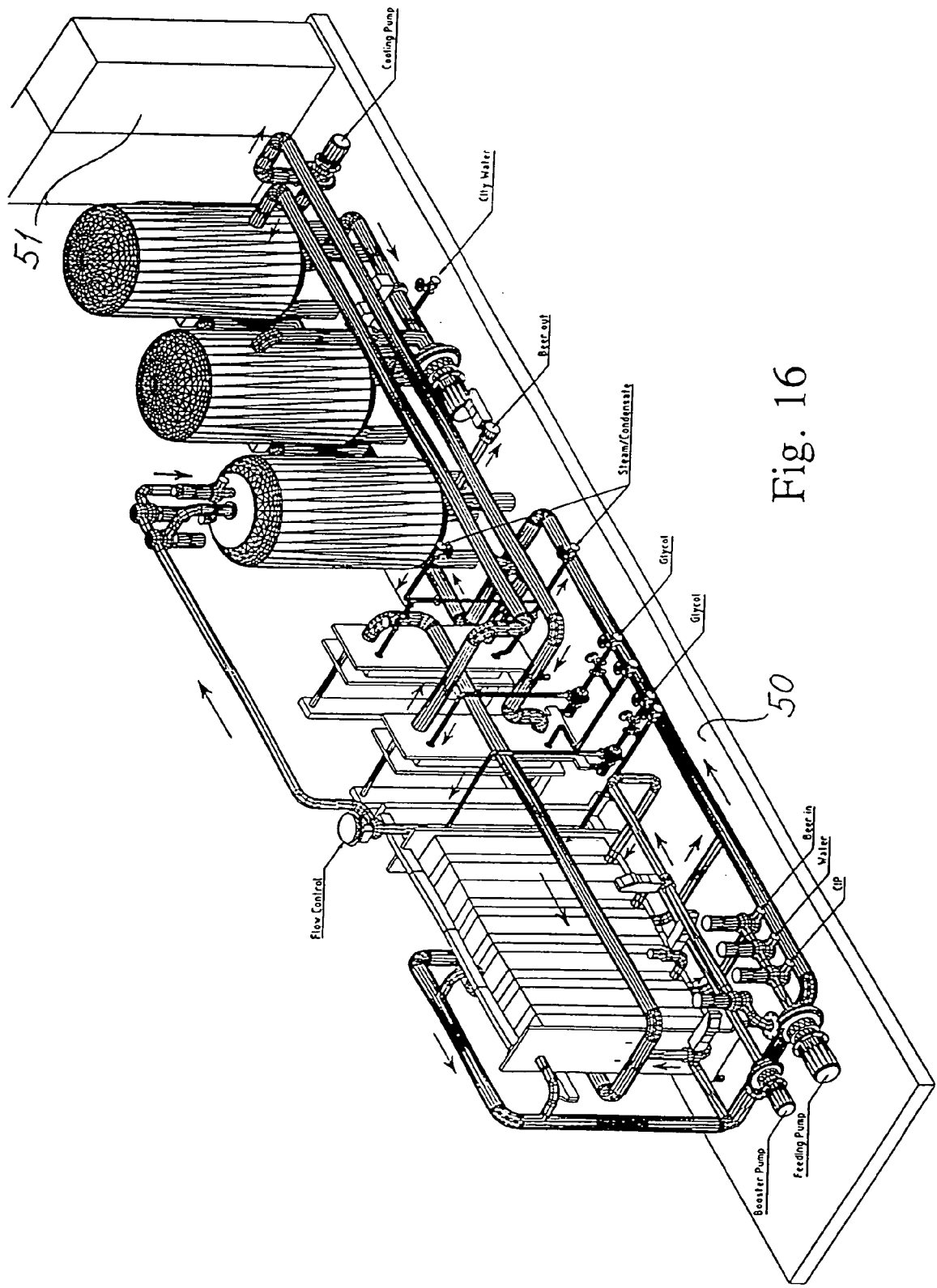
FIGS. 16 and 17 are isometric views from two sides of a pasteurizing apparatus according to the invention.
Figure 17:
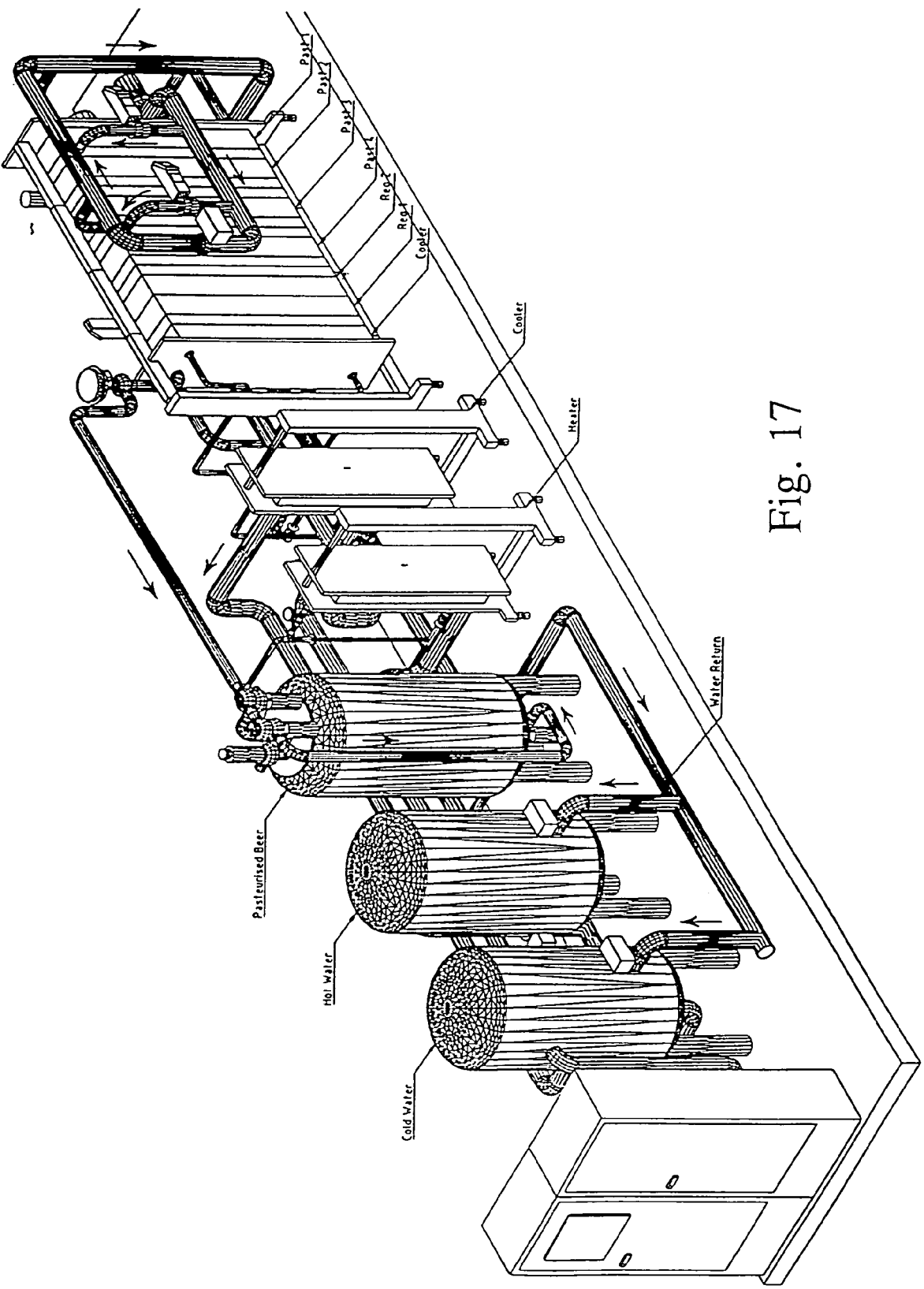

Referring now to FIGS. 16 and 17 which are isometric views from two sides of a pasteurizing apparatus according to the invention and generally corresponding to the flow-diagram or diagrammatic view in FIGS. 4 and 5 with the difference that in this embodiment shown in FIGS. 16 and 17 cooling and heating, respectively, may only take place in all the pasteurizing heat exchanger (past.1-past.4) simultaneously. The flow of water and beer, respectively, is shown by means of the arrows. The apparatus is quite compact and is mounted on a base plate 50 having a cabinet 51 for all the regulating and computing equipment, the base plate 50 being of a size allowing the entire apparatus to be transported in a commercially available 40 ft marine container. This is of great importance for the economical aspects of the apparatus according to the invention as the compactness allows shop-floor construction, trial operation and even part commissioning which entails large savings both as regards installation time and costs.

Figure 18:
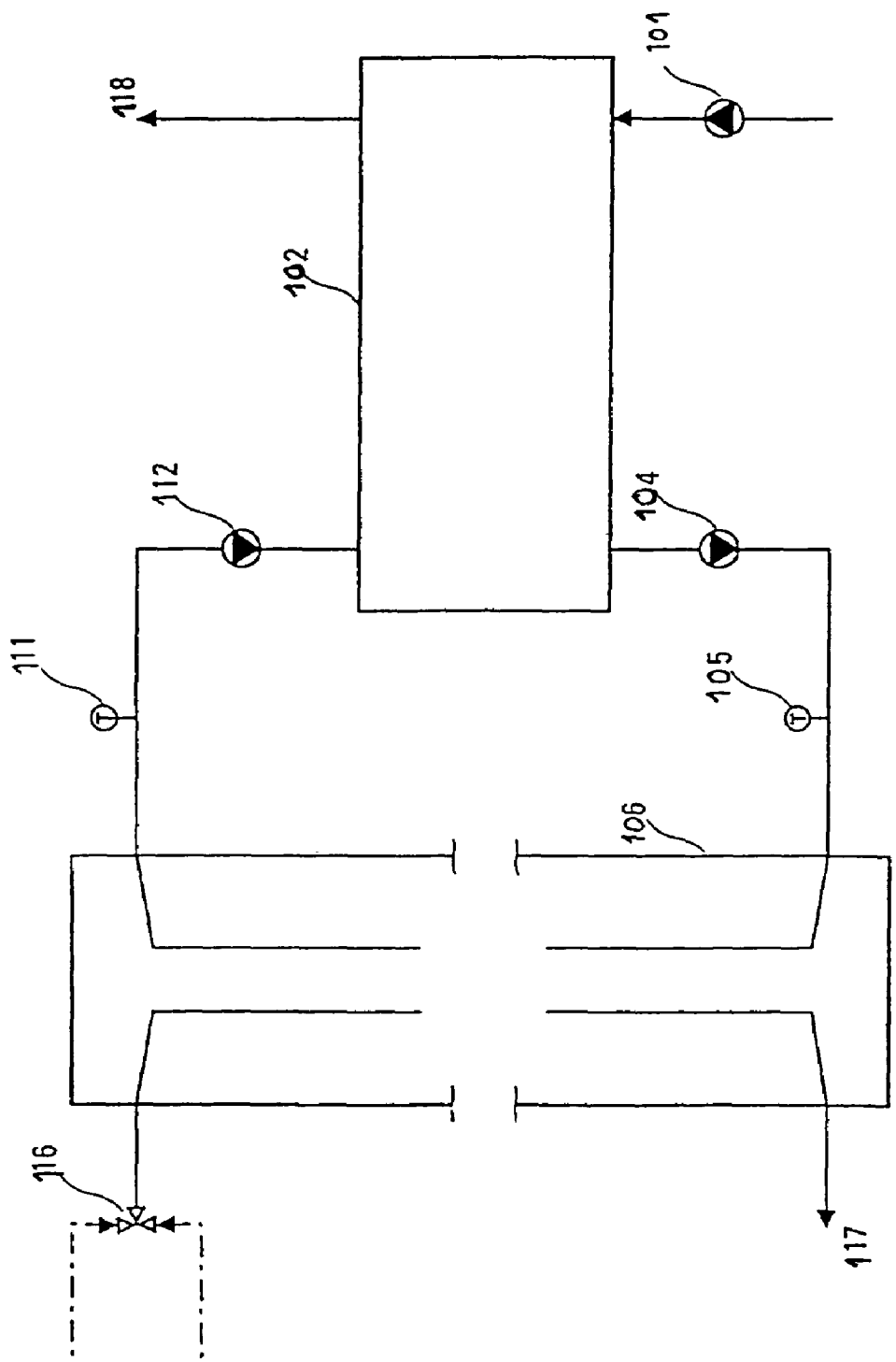
FIG. 18 shows a diagrammatic view of another embodiment of a pasteurizing apparatus for the pasteurization of liquid products in a continuous flow.

Referring now to FIG. 18, an apparatus for the pasteurizing of liquid products in a continuous flow, as for example fluid foodstuffs and beverages, consists of a regenerative part 102 into which the product is fed by a supply pump 101.

After the regenerative part 102, the product is led further to the pasteurizing part 106 which cannot only heat the product to the pasteurization temperature, but also cool the product down in the event of a stop in production. Both the regenerative part 102 and the pasteurizing part 106 consist of heat exchangers. Heating or cooling takes place by supplying hot or cold water via a mixing valve 116 to the pasteurizing part 106. Temperature sensors 105, 111 are placed before and after the pasteurizing part 106, so that the pasteurization process can be controlled. Between the regenerative part 102 and the pasteurizing part 106 there are also placed booster pumps 104, 112 which ensure that the product has constant over-pressure in the apparatus.

The product is now led back to the regenerative part 102 where it transfers its heat to the product in the inlet. Hereafter, the product is led to an outlet 18 where, for example, a filling plant (not shown) can be placed.

The apparatus can be produced in several configurations, depending on demands regarding temperatures and pasteurizing. The temperatures used in the following are thus only examples, since each product has its own specific temperature requirements.

Figure 19:
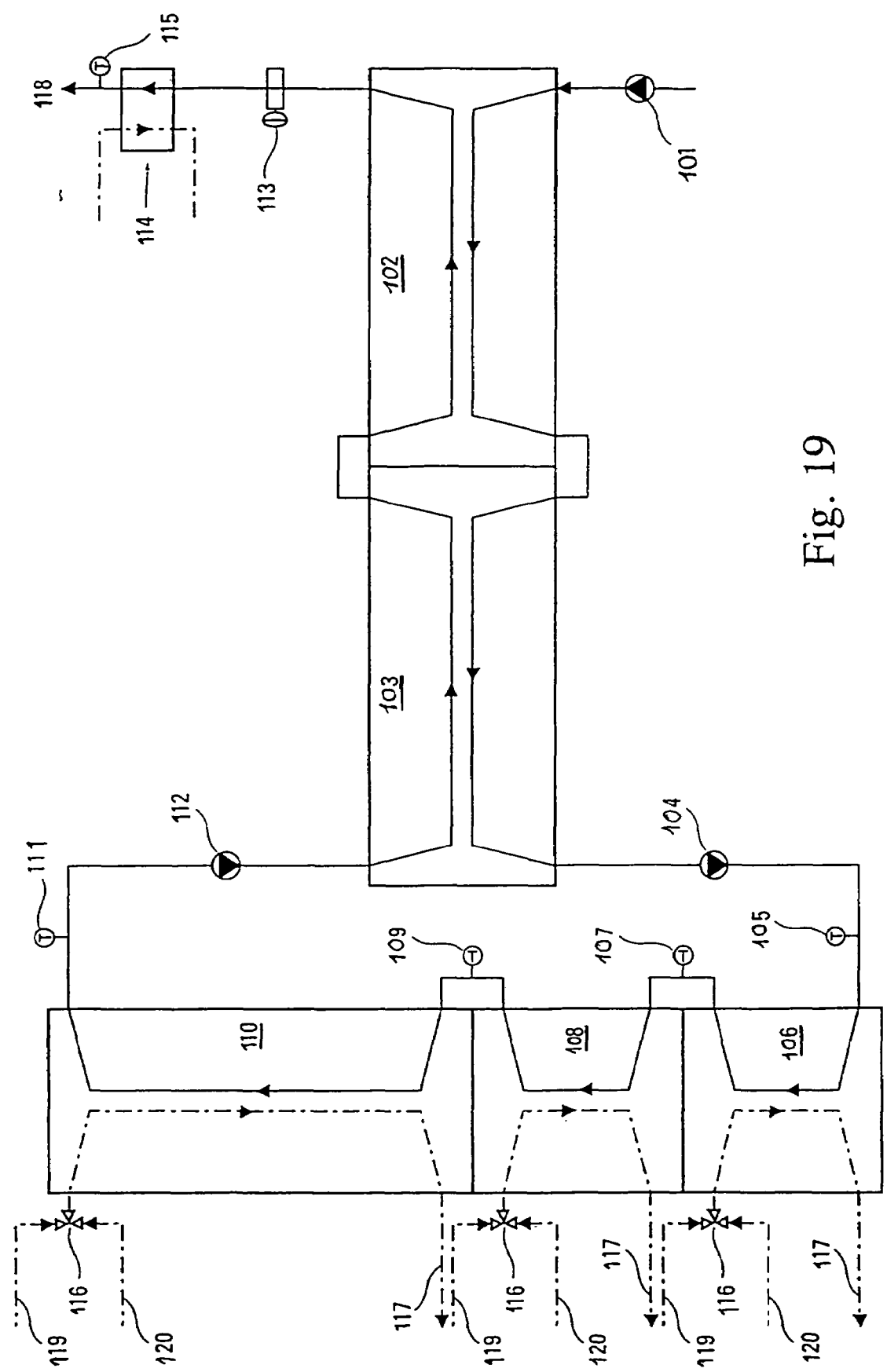
FIG. 19 shows a diagrammatic view of a pasteurizing apparatus as shown in FIG. 1, but with two regenerative zones and three pasteurizing zones.

The apparatus taken here as starting point (see FIG. 19) is intended for the pasteurizing of beer. The apparatus consists of two main heat exchangers, i.e. a regenerative heat exchanger which is divided into two zones 102,103, and a pasteurizing heat exchanger which is divided into three zones 106, 108, 110.

The product is led into the regenerative zone 102 by means of a supply pump 1, where the product at 2° C. is heated to 33° C. The product is now led further to the second regenerative zone 103 where it is heated to 65° C. A booster pump 104 and 112 ensures that there is an over-pressure, partly in the pasteurizing heat exchanger 106, 108, 110 and partly in the cooling part of the regenerative heat exchanger 102,103. This over-pressure ensures that in the event of a possible leakage, air or fluid does not come into the pipe system, but only out. In this way it is avoided that bacteria capable of survival are transferred to the pasteurized product.

A temperature sensor 105 is provided before the inlet to the pasteurizing heat exchanger.

Figure 20:
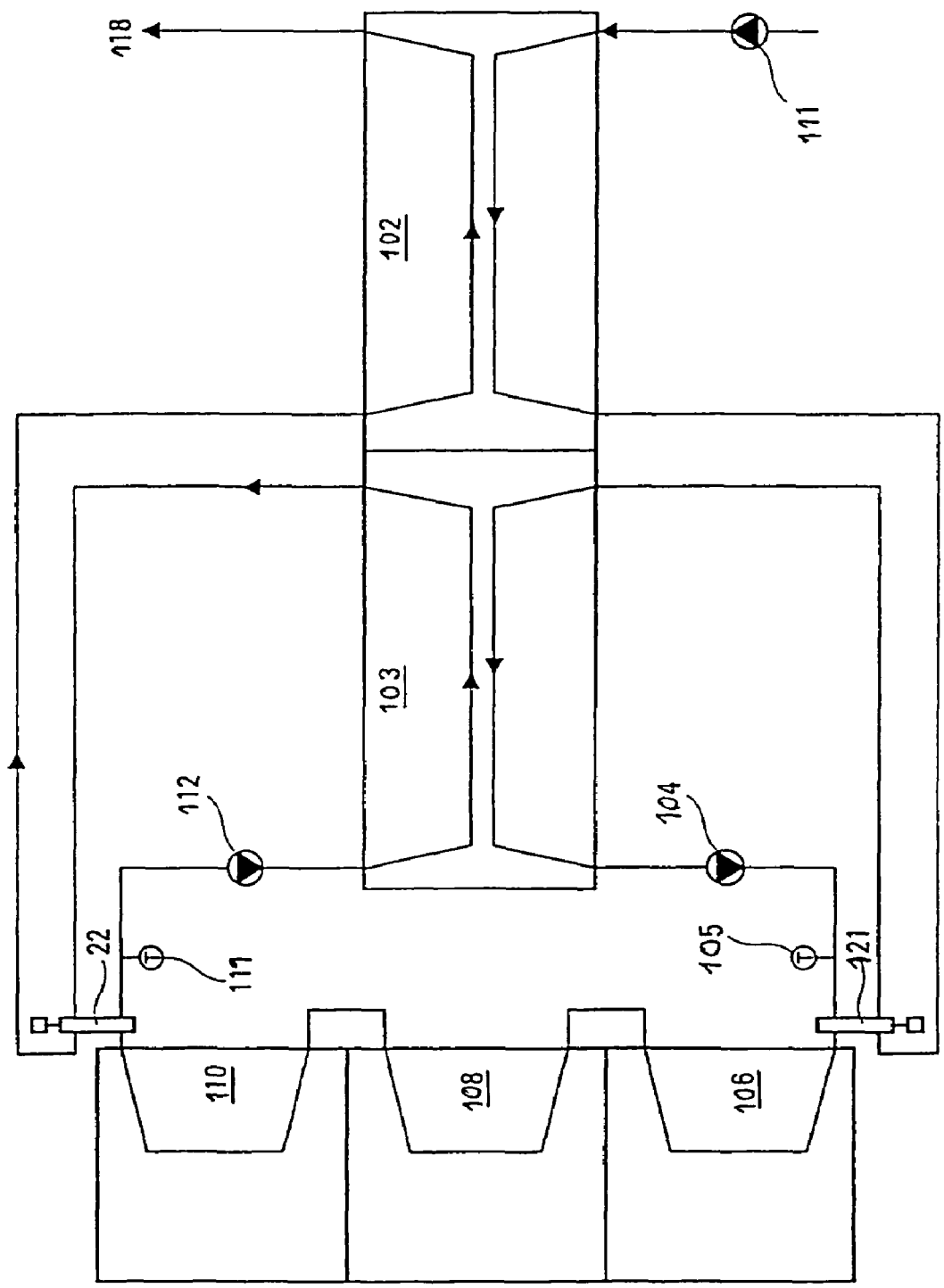
FIG. 20 shows a diagrammatic view of a pasteurizing apparatus as shown in FIG. 19, but with re-circulation in the regenerative part.

A valve 121 (see FIG. 20) is placed as close as possible to the pasteurizing heat exchanger. During normal operation, this valve 121 ensures that the inlet and the outlet from the regenerative heat exchanger 103 on the nonpasteurized side are held separate. During a stop in production, the valve 121 is opened, whereby re-circulation is made possible in this side of the regenerative heat exchanger 103. This valve is optional and is not used in the cases/configurations where the outlet temperature from the heat exchanger 103 is below the temperature limit for the recording of PU.

At the inlet to the first zone 6 of the pasteurizing heat exchanger, the product at 65° C. is heated on the primary side to 72° C., this temperature being held through the zones 108 and 110.

A valve 122 is placed as close as possible after the pasteurizing heat exchanger. Under normal operation, this valve must ensure that the inlet and outlet from the regenerative heat exchanger 103 are held separate on the pasteurized side. During a stop in production, the valve is opened, whereby re-circulation becomes possible in this second side of the regenerative heat exchanger 103.

When the product leaves the last pasteurizing zone 110, it is pumped via the booster pump 112 into the cooling part of the regenerative part 103 and is cooled down to approx. 40° C., and further to the last regenerative zone 102 where the product is cooled down to 9° C. A flow-control valve 113 can be placed after the regenerative part. Hereafter, the product flows through a cooler 114 and further to an outlet 118 where a possible buffer tank and/or a bottling or containerising plant is placed. With an embodiment having a minimal buffer tank, the flow-control valve 113 ensures that the buffer tank does not get over-filled, i.e. that the flow is controlled by the level in the buffer tank.

In an apparatus without buffer tank, it is the filling plant (not shown) which determines the flow through the apparatus.

The cooler 114 is used only if the outlet temperature of the product becomes too high, e.g. as a result of a stop in operations and subsequent re-starting.

A temperature sensor 107, 109, 111 is placed after each pasteurizing part 106, 108, 110. A temperature sensor 115 is also placed after the cooler 114. These sensors register whether or not the necessary temperatures have been achieved, so that heating and cooling respectively can be controlled on the secondary side of the pasteurizing heat exchanger 106, 108, 110.

The heating/cooling sources in the regenerative part 102, 103 consist of the product itself (hence regenerative), and in the pasteurizing part 106, 108, 110 of hot and cold water 19, 20 respectively, where the amount of heat in the water is determined by signals from the temperature sensors 107, 109, 111 in the individual pasteurizing zones 106, 108, 110. The regulation of the water supply itself is effected in a mixing valve 116 of commonly known type. The return water from the secondary side of the pasteurizing heat exchanger is led away via a return pipe 117, possibly for heating with a view to re-use in the heat exchanger.

The following is a description of the apparatus during a stop in production.

The regenerative heat exchanger can be divided into two zones 102 and 103 as shown, or constitute a single zone. In the event of a stop in production, the temperature profile in the first zone will be constant for the first minutes, after which the temperature will slowly approach the average temperature for the heat exchanger. In the second zone, or if there is only one zone, the temperature in the last part of the exchanger and in the pipe connections hereto will be so high that PU is recorded. To avoid this, re-circulation takes place in both the regenerative zones and pipe connections until a constant average temperature is achieved below the temperature limit for the recording of PU (e.g. 53° C.). The re-circulation is effected by opening the valves 121 and 122.

The pasteurizing zones 106, 108, 110 will be cooled down to e.g. 56° C. during a production stop, so that the recording of PU is stopped.

The following is a description of the apparatus when re-started after a stop in production.

After a stop in production, ail of the pasteurizing zones are re-heated to the normal temperatures to ensure that no under-pasteurization occurs, and also that over-pasteurizing is limited as much as possible.

When re-starting an apparatus without buffer tank, the process is controlled by raising the temperature on the secondary side of the pasteurizing heat exchanger 106, 108, 110 depending on the speed of flow.

The above embodiments and the apparatus according to the invention have been described by way of example, and various modifications and amendments will be obvious to those skilled in the art without departing from the scope of the appended claims.

What is claimed is:

1. An apparatus for pasteurizing a liquid product in a continuous flow, the apparatus comprising:
    regenerative heat exchanger having a first inlet, a second inlet, and an outlet, the first inlet being configured to receive the product from a pump;
    a pasteurizing heat exchanger having an inlet conduit fluidly coupled to the outlet of the regenerative heat exchanger so as to receive the product therefrom, and an outlet conduit fluidly coupled to the second inlet of the regenerative heat exchanger;
    a hot water source and a cold water source;
    a water conduit fluidly passing through the pasteurizing heat exchanger;
    a temperature sensor operatively associated with the pasteurizing heat exchanger so as to generate an output signal indicative of the temperature of the product in the pasteurizing heat exchanger; and
    a mixing valve fluidly coupling the water conduit to the hot water source and the cold water source, the valve being operable to supply a controllable-variable mixture of hot and cold water to the pasteurizing heat exchanger in response to the output signal from the temperature sensor.

2. An apparatus for pasteurizing a liquid product in a continuous flow, the apparatus comprising:
    a regenerative heat exchanger having a first inlet, a second inlet, and an outlet, the first inlet being configured to receive the product from a pump;
    a pasteurizing heat exchanger fluidly coupled between the outlet of the regenerative heat exchanger and the second inlet of the regenerative heat exchanger, the pasteurizing heat exchanger defining at least first, second, and third pasteurizing zones;
    first, second, and third water conduits fluidly passing through the first, second, and third pasteurizing zones, respectively;
    a hot water source and a cold water source fluidly coupled to the first, second, and third water conduits through first second and third mixing valves, respectively; and
    first, second, and third temperature sensors operatively associated with the first, second, and third pasteurizing zones, respectively, each of the temperature sensors being operable to generate an output signal indicative of the temperature of the product in its associated pasteurizing zone;
    wherein the first, second, and third mixing valves are operable to supply a controllably-variable mixture of hot and cold water to the first, second, and third conduits from the hot water source and the cold water source in response to the output signals from the first, second, and third temperature sensors, respectively.

* * * * *

UNITED STATES PATENT AND TRADEMARK OFFICE
CERTIFICATE OF CORRECTION

PATENT NO. : 7,644,654 B2  Page 1 of 1
APPLICATION NO. : 10/770793
DATED : January 12, 2010
INVENTOR(S) : Nielsen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1655 days.

Signed and Sealed this

Sixteenth Day of November, 2010

David J. Kappos
*Director of the United States Patent and Trademark Office*